US012338068B2

(12) United States Patent
Lewis et al.

(10) Patent No.: US 12,338,068 B2
(45) Date of Patent: Jun. 24, 2025

(54) REFUSE CONTAINER ENGAGEMENT

(71) Applicant: The Heil Co., Chattanooga, TN (US)

(72) Inventors: David G. Lewis, Chattanooga, TN (US); Stanley L. Maroney, Attalla, AL (US); Chad R. Blanchard, Cumming, GA (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 18/217,387

(22) Filed: Jun. 30, 2023

(65) Prior Publication Data

US 2024/0034555 A1 Feb. 1, 2024

Related U.S. Application Data

(63) Continuation of application No. 17/644,210, filed on Dec. 14, 2021, now Pat. No. 11,807,450, which is a continuation of application No. 16/856,698, filed on Apr. 23, 2020, now Pat. No. 11,208,262.

(60) Provisional application No. 62/837,667, filed on Apr. 23, 2019.

(51) Int. Cl.
*B65F 3/04* (2006.01)
*B65F 3/02* (2006.01)

(52) U.S. Cl.
CPC ........ *B65F 3/041* (2013.01); *B65F 2003/023* (2013.01); *B65F 2003/0253* (2013.01); *B65F 2003/0269* (2013.01)

(58) Field of Classification Search
CPC ................................ B65F 3/041; B65F 3/023
See application file for complete search history.

(56) References Cited

U.S. PATENT DOCUMENTS

| | | | |
|---|---|---|---|
| 2,949,199 | A | 8/1960 | Jones |
| 4,279,328 | A | 7/1981 | Ahlbom |
| 4,868,796 | A | 9/1989 | Ahrens et al. |
| 5,004,392 | A | 4/1991 | Naab |
| 5,007,786 | A | 4/1991 | Bingman |
| 5,215,423 | A | 6/1993 | Schulte-Hinsken et al. |
| 5,601,392 | A | 2/1997 | Smith et al. |

(Continued)

FOREIGN PATENT DOCUMENTS

| | | |
|---|---|---|
| EP | 0214453 | 3/1987 |
| EP | 0955252 | 11/1999 |

(Continued)

OTHER PUBLICATIONS

EagleVisionSystems.com, "Bin-Seeker," 2017, retrieved from <http://eaglevisionsystems.com/EagleVision Bin-Seeker Datasheet.pdf>, 3 pages.

(Continued)

*Primary Examiner* — Jonathan Snelting
(74) *Attorney, Agent, or Firm* — Fish & Richardson P.C.

(57) ABSTRACT

A refuse collection vehicle includes a grabber that is operable to engage a refuse container, at least one sensor that is arranged to collect data indicating a relative positioning of a first arm of the grabber and a second arm of the grabber, and a controller having one or more control elements for selecting a target positioning of a first arm of the grabber and a second arm of the grabber. The first arm and the second arm automatically move to the target positioning in response to a signal received by an onboard computing device of the vehicle.

20 Claims, 10 Drawing Sheets

(56) References Cited

U.S. PATENT DOCUMENTS

| | | | | |
|---|---|---|---|---|
| 5,711,565 | A | 1/1998 | Smith et al. | |
| 5,755,547 | A | 5/1998 | Flerchinger et al. | |
| 5,762,461 | A | 6/1998 | Fröhlingsdorf | |
| 5,851,100 | A | 12/1998 | Brandt | |
| 5,863,086 | A | 1/1999 | Christenson | |
| 5,938,710 | A | 8/1999 | Lanza et al. | |
| 5,967,731 | A | 10/1999 | Brandt | |
| 6,004,092 | A | 12/1999 | Johnson et al. | |
| 6,152,673 | A | 11/2000 | Anderson et al. | |
| 6,476,855 | B1 | 11/2002 | Yamamoto | |
| 6,520,008 | B1 | 2/2003 | Stragier | |
| 7,070,382 | B2 | 7/2006 | Pruteanu et al. | |
| 7,072,745 | B2 | 7/2006 | Pillar et al. | |
| 7,219,769 | B2 | 5/2007 | Yamanouchi et al. | |
| 7,980,808 | B2 | 7/2011 | Chilson et al. | |
| 8,322,968 | B1 | 12/2012 | Mizner | |
| 8,753,062 | B2 | 6/2014 | Curotto | |
| 8,833,823 | B2 | 9/2014 | Price et al. | |
| 9,296,326 | B1 | 3/2016 | Young | |
| 9,403,278 | B1 | 8/2016 | Van Kampen et al. | |
| 9,580,014 | B2 | 2/2017 | Lucas et al. | |
| 9,635,346 | B2 | 4/2017 | Iida | |
| 9,926,135 | B2 | 3/2018 | Whitfield, Jr. et al. | |
| 10,048,398 | B2 | 8/2018 | Rose et al. | |
| 10,196,206 | B2 | 2/2019 | Whitfield, Jr. et al. | |
| 10,661,986 | B2 | 5/2020 | Price et al. | |
| 10,831,201 | B2 | 11/2020 | Spence | |
| 10,974,895 | B2 | 4/2021 | McNeilus et al. | |
| 11,208,262 | B2 | 12/2021 | Lewis et al. | |
| 11,318,885 | B2 | 5/2022 | Phillips et al. | |
| 11,453,550 | B2 | 9/2022 | Maroney et al. | |
| 11,603,265 | B2 | 3/2023 | Williams et al. | |
| 11,807,450 | B2 * | 11/2023 | Lewis | B65F 3/048 |
| 2002/0159870 | A1 | 10/2002 | Pruteanu et al. | |
| 2003/0031543 | A1 | 2/2003 | Elbrink | |
| 2006/0061481 | A1 | 3/2006 | Kurple et al. | |
| 2008/0089764 | A1 | 4/2008 | Vistro | |
| 2008/0199298 | A1 | 8/2008 | Chilson et al. | |
| 2009/0114485 | A1 | 5/2009 | Eggert | |
| 2009/0271058 | A1 | 10/2009 | Chilson | |
| 2013/0039728 | A1 | 2/2013 | Price et al. | |
| 2015/0093221 | A1 | 4/2015 | Parker | |
| 2016/0355335 | A1 | 12/2016 | Whitfield, Jr. et al. | |
| 2017/0243369 | A1 | 8/2017 | Iida et al. | |
| 2017/0362030 | A1 | 12/2017 | Steimel | |
| 2017/0369242 | A1 | 12/2017 | McNeilus et al. | |
| 2018/0089517 | A1 | 3/2018 | Douglas et al. | |
| 2018/0134531 | A1 | 5/2018 | Tanaka et al. | |
| 2018/0319640 | A1 | 11/2018 | Flenoid | |
| 2018/0319642 | A1 | 11/2018 | Pronger et al. | |
| 2018/0346241 | A1 | 12/2018 | Errington et al. | |
| 2019/0135599 | A1 | 5/2019 | Myers et al. | |
| 2019/0225422 | A1 | 7/2019 | Wrigley et al. | |
| 2019/0325220 | A1 | 10/2019 | Wildgrube et al. | |
| 2020/0247609 | A1 | 8/2020 | Maroney et al. | |
| 2020/0339345 | A1 | 10/2020 | Lewis et al. | |
| 2020/0339346 | A1 | 10/2020 | Maroney et al. | |
| 2020/0339347 | A1 | 10/2020 | Williams et al. | |
| 2020/0342240 | A1 | 10/2020 | Szoke-Sieswerda et al. | |
| 2022/0106113 | A1 | 4/2022 | Lewis et al. | |
| 2022/0234822 | A1 | 7/2022 | Maroney et al. | |

FOREIGN PATENT DOCUMENTS

| | | |
|---|---|---|
| EP | 1020375 | 7/2000 |
| EP | 3284704 | 2/2018 |
| FR | 3045027 | 6/2017 |
| JP | H09-208199 | 8/1997 |
| JP | H09-210594 | 8/1997 |
| JP | 2009-241247 | 10/2009 |
| JP | 2016-068233 | 5/2016 |
| JP | 2017-178567 | 10/2017 |
| KR | 10-0846313 | 7/2008 |
| WO | WO 2013055309 | 4/2013 |
| WO | WO 2018009961 A1 | 1/2018 |
| WO | WO 2020163383 | 8/2020 |

OTHER PUBLICATIONS

EagleVisionSystems.com, “Vision Systems,” Aug. 2015, retrieved from URL <http://eaglevisionsystems.com/vision.html>, 1 page.

EP Search Report in European Appln. No. 20752428.1, dated Feb. 25, 2022, 14 pages.

Extended European Search Report in European Appln. No. 20795932.1, dated May 13, 2022, 10 pages.

PCT International Search Report and Written Opinion in International Application No. PCT/US2020/016648, dated Jun. 3, 2020, 11 pages.

PCT International Search Report and Written Opinion in International Application No. PCT/US2020/029637, dated Jul. 24, 2020, 11 pages.

PCT International Search Report and Written Opinion in International Application No. PCT/US2020/029639, dated Jul. 29, 2020, 11 pages.

PCT International Search Report and Written Opinion in International Application No. PCT/US2020/029646, dated Jul. 29, 2020, 10 pages.

Office Action in European Appln. No. 20795932.1, mailed on Mar. 25, 2024, 7 pages.

Mohamed et al., “Detection and Tracking of Pallets using a Laser Rangefinder and Machine Learning Techniques,” HAL Open Science, Robotics, Sep. 2017, 77 pages.

Office Action in Australian Appln. No. 2020219848, mailed on Dec. 5, 2024, 4 pages.

Office Action in Canadian Appln. No. 3,129,088 mailed on Sep. 23, 2024, 4 pages.

* cited by examiner

REFUSE CONTAINER ENGAGEMENT

CROSS-REFERENCE TO RELATED APPLICATIONS

This application is a continuation of U.S. patent application Ser. No. 17/644,210, entitled "Refuse Container Engagement," filed Dec. 14, 2021, which is a continuation of U.S. patent application Ser. No. 16/856,698, entitled "Refuse Container Engagement," filed Apr. 23, 2020, now U.S. Pat. No. 11,208,262, which claims the benefit under 35 U.S.C. § 119(e) of U.S. Patent Application No. 62/837,667, entitled "Refuse Container Engagement," filed Apr. 23, 2019, which are incorporated herein by reference in their entirety.

TECHNICAL FIELD

This disclosure relates to systems and method for operating a refuse collection vehicle to engage a refuse container.

BACKGROUND

Refuse collection vehicles have been used for generations for the collection and transfer of waste. Traditionally, collection of refuse with a refuse collection vehicle required two people: (1) a first person to drive the vehicle and (2) a second person to pick up containers containing waste and dump the waste from the containers into the refuse collection vehicle. Technological advantages have recently been made to reduce the amount of human involvement required to collect refuse. For example, some refuse collection vehicles include features that allow for collection of refuse with a single operator, such as mechanical or robotic lift arms.

SUMMARY

Many aspects of the disclosure feature operating a mechanical grabber to perform refuse collection.

In an example implementation, a refuse collection vehicle includes a grabber that is operable to engage a refuse container, at least one sensor that is arranged to collect data indicating a relative positioning of a first arm of the grabber and a second arm of the grabber, and a controller having one or more control elements for selecting a target positioning of a first arm of the grabber and a second arm of the grabber. The first arm and the second arm automatically move to the target positioning in response to a signal received by an onboard computing device of the vehicle.

In an aspect combinable with the example implementation, the target positioning includes an angle between each of the first arm and the second arm and a longitudinal axis of a grabber beam of the refuse collection vehicle in a range of 0 degrees to 90 degrees.

In another aspect combinable with any of the previous aspects, the controller includes a touch input display.

In another aspect combinable with any of the previous aspects, the target positioning is selected by manually engaging at least one of the one or more control elements.

In another aspect combinable with any of the previous aspects, manually engaging at least one of the one or more control elements changes the target positioning by an incremental amount.

In another aspect combinable with any of the previous aspects, the incremental amount is 1.125 degrees.

In another aspect combinable with any of the previous aspects, at least one of the one or more control elements corresponds to a refuse container size.

In another aspect combinable with any of the previous aspects, manually engaging at least one of the one or more control elements corresponding to a refuse container size changes the target positioning to a positioning of the first arm and second arm corresponding to the refuse container size.

In another aspect combinable with any of the previous aspects, the relative positioning of the first arm and second arm corresponding to the refuse container size includes a distance between the first arm and second arm larger than a width of a refuse container corresponding to the refuse container size.

In another aspect combinable with any of the previous aspects, the relative positioning of the first arm and second arm corresponding to the refuse container size includes a distance between the first arm and second arm that is four inches larger than a width of a refuse container corresponding to the refuse container size.

In another aspect combinable with any of the previous aspects, at least one of the one or more control elements corresponds to a baseline positioning, and manually engaging the at least one of the one or more control elements corresponding to the baseline positioning changes the target positioning to the baseline positioning.

In another aspect combinable with any of the previous aspects, the baseline positioning is selectable by an operator of the refuse collection vehicle.

Another aspect combinable with any of the previous aspects further includes an onboard computing device communicatively coupled to the at least one sensor and the controller.

In another aspect combinable with any of the previous aspects, the at least one sensor is located in a cylinder coupled to the grabber.

In another aspect combinable with any of the previous aspects, the sensor determines a distance between the first arm and the second arm based on an amount of extension of a piston coupled to the cylinder.

In another example implementation, a refuse collection vehicle includes a grabber that is operable to engage a refuse container, at least one sensor that is arranged to collect data indicating a relative positioning of a first arm of the grabber and a second arm of the grabber, at least one camera arranged to generate image data of a scene external to the refuse collection vehicle, and an onboard computing device coupled to the at least one sensor and the at least one camera and configured to process the image data to determine a target positioning. The first arm and the second arm automatically move to the target positioning in response a determination of the target positioning by the onboard computing device.

In an aspect combinable with the example implementation, the target positioning includes a distance between the first arm and the second arm that is larger than a width of the refuse container.

In another aspect combinable with any of the previous aspects, automatically moving the first arm and the second arm to the target positioning includes receiving, by the onboard computing device, sensor data collected by at least one sensor, the sensor data indicating a relative positioning of a first arm of a grabber of a refuse collection vehicle and a second arm of the grabber, receiving, by the onboard computing device, image data from the camera, determining, by the onboard computing device, a target positioning based on the image data, determining, based on the relative positioning between the first arm and the second arm and the target positioning, a direction of travel of a piston coupled to the grabber required to position the first arm and second arm in the target positioning, and moving the piston in the determined direction of travel.

In another aspect combinable with any of the previous aspects, automatically moving the first arm and the second arm to the target positioning includes receiving, by the onboard computing device, sensor data from the sensor indicating that the first arm and the second arm are positioned in the target positioning, and in response to receiving sensor data indicating that the first arm and the second arm are positioned in the target positioning, stopping travel of the piston In another aspect combinable with any of the previous aspects, determining a target positioning based on the image data includes analyzing, by the onboard computing device, the image data to determine that the refuse collection vehicle is proximate a refuse container, processing, by the onboard computing device, the image data to determine a width of the refuse container, and determining, based on the width of the refuse container, the target positioning.

In another aspect combinable with any of the previous aspects, the first arm and the second arm travel an equal amount in response to the determination of the target positioning.

In another aspect combinable with any of the previous aspects, the at least one sensor is located in a cylinder coupled to the grabber.

In another aspect combinable with any of the previous aspects, the onboard computing device determines a distance between the first arm and the second arm based on an amount of extension of a piston coupled to the cylinder detected by the sensor.

In another example implementation, a refuse collection vehicle includes a grabber that is operable to engage a refuse container, at least one body sensor that is arranged to collect data indicating a relative positioning of a first arm of the grabber and a second arm of the grabber, at least one container sensor arranged to generate sensor data indicating the presence of the refuse container, and an onboard computing device coupled to the at least one body sensor and the at least one container sensor. The first arm and the second arm automatically move to a target positioning in response a determination of the target positioning by the onboard computing device.

In an aspect combinable with the example implementation, automatically moving the first arm and the second arm to the target positioning includes receiving, by the onboard computing device, sensor data collected by at least one body sensor, the sensor data indicating a relative positioning of a first arm of a grabber of a refuse collection vehicle and a second arm of the grabber, receiving, by the onboard computing device, sensor data from the at least one container sensor, determining, by the onboard computing device, a presence of the refuse container based on the sensor data received from the at least one container sensor, receiving, by the onboard computing device, a target positioning from a controller of the refuse collection vehicle, determining, based on the relative positioning between the first arm and the second arm and the target positioning, a direction of travel of a piston coupled to the grabber required to position the first arm and second arm in the target positioning, and in response to determining a presence of the refuse container, moving the piston in the determined direction of travel.

In another aspect combinable with any of the previous aspects, automatically moving the first arm and the second arm to the target positioning includes receiving, by the onboard computing device, sensor data from the at least one body sensor indicating that the first arm and the second arm are positioned in the target positioning, and in response to receiving sensor data indicating that the first arm and the second arm are positioned in the target positioning, stopping travel of the piston.

In another aspect combinable with any of the previous aspects, automatically moving the first arm and the second arm to the target positioning includes receiving, by the onboard computing device, sensor data collected by at least one body sensor, the sensor data indicating a relative positioning of a first arm of a grabber of a refuse collection vehicle and a second arm of the grabber, receiving, by the onboard computing device, sensor data from the at least one container sensor, determining, by the onboard computing device, a target positioning based on the sensor data received from the at least one container sensor, determining, based on the relative positioning between the first arm and the second arm and the target positioning, a direction of travel of a piston coupled to the grabber required to position the first arm and second arm in the target positioning, and moving the piston in the determined direction of travel.

In another aspect combinable with any of the previous aspects, determining a target positioning based on the sensor data received from the at least one container sensor includes analyzing, by the onboard computing device, the sensor data received from the at least one container sensor to determine that the refuse collection vehicle is proximate a refuse container, processing, by the onboard computing device, the sensor data received from the at least one container sensor to determine a width of the refuse container, and determining, based on the width of the refuse container, the target positioning.

In another aspect combinable with any of the previous aspects, the target positioning includes a distance between the first arm and the second arm that is four inches larger than a width of the refuse container.

In another aspect combinable with any of the previous aspects, the first arm and the second arm travel an equal amount in response to the determination of the target positioning.

In another aspect combinable with any of the previous aspects, the at least one body sensor is located in a cylinder coupled to the grabber.

In another aspect combinable with any of the previous aspects, the onboard computing device determines a distance between the first arm and the second arm based on an amount of extension of a piston coupled to the cylinder detected by the at least one body sensor.

In another aspect combinable with any of the previous aspects, the at least one container sensor is coupled to a grabber beam of the refuse collection vehicle.

Potential benefits of the one or more implementations described in the present specification may include increased waste collection efficiency and reduced operator error in refuse collection. The one or more implementations may also reduce the likelihood of damaging refuse containers and refuse collection vehicles during the refuse collection process. The one or more implementations may also reduce the risk of injury to operators of refuse collection vehicles by reducing the need for an operator to physically interact with a refuse container to perform refuse collection.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the subject matter of this disclosure are set forth in the accompanying drawings and the description below. Other features, objects, and advantages of the subject matter will be apparent from the description and drawings, and from the claims.

DETAILED DESCRIPTION

Figure 1:
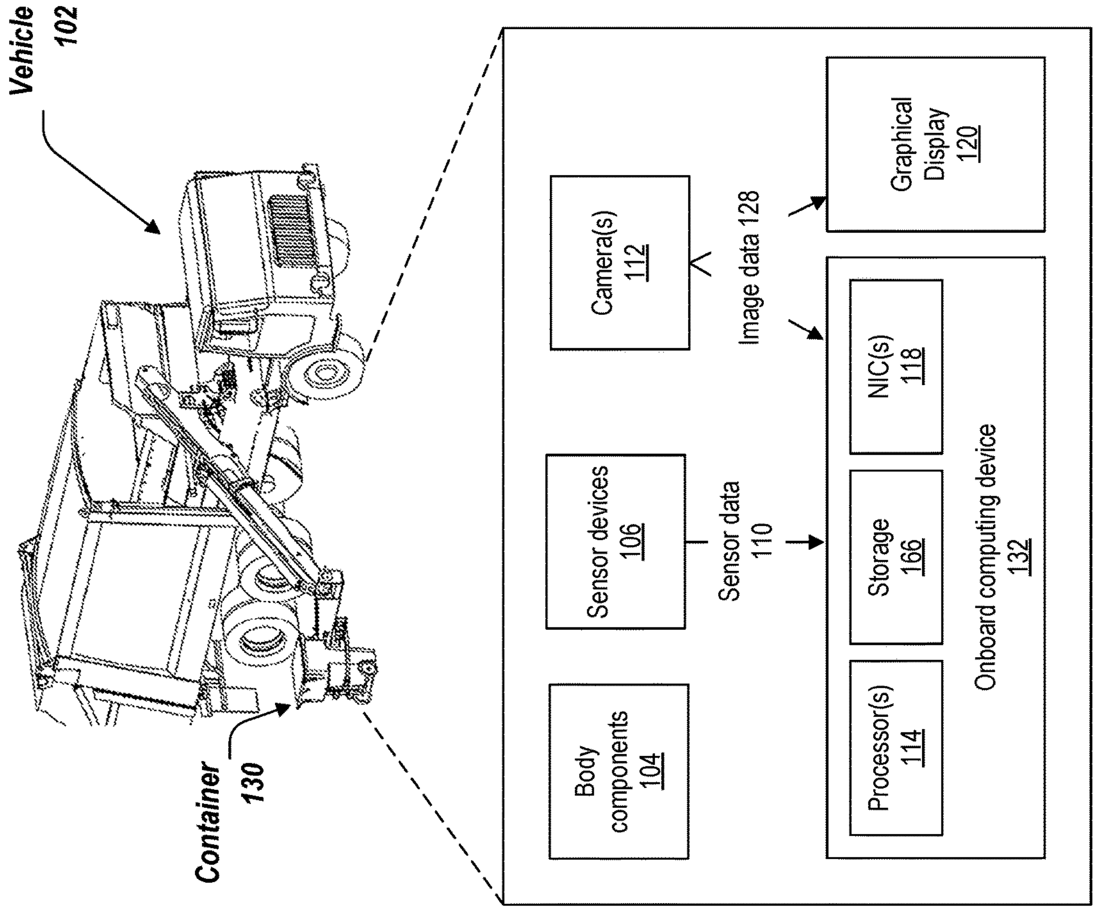
FIG. 1 depicts an example system for collecting refuse.

FIG. 1 depicts an example system for collecting refuse. Vehicle 102 is a refuse collection vehicle that operates to collect and transport refuse (e.g., garbage). The refuse collection vehicle 102 can also be described as a garbage collection vehicle, or garbage truck. The vehicle 102 is configured to lift containers 130 that contain refuse, and empty the refuse in the containers into a hopper of the vehicle 102, to enable transport of the refuse to a collection site, compacting of the refuse, and/or other refuse handling activities.

The body components 104 of the vehicle 102 can include various components that are appropriate for the particular type of vehicle 102. A vehicle with an ASL, such as the example shown in FIGS. 2A-2C, may include body components 104 involved in the operation of the ASL, such as an arm and/or grabbers, as well as other body components such as a pump, a tailgate, a packer, and so forth. Body components 104 may also include other types of components that operate to bring garbage into a hopper (or other storage area) of a truck, compress and/or arrange the garbage in the vehicle, and/or expel the garbage from the vehicle.

The vehicle 102 can include any number of body sensor devices 106 that sense body component(s) 104 and generate sensor data 110 describing the operation(s) and/or the operational state of various body components. The body sensor devices 106 are also referred to as sensor devices, or sensors. Sensors may be arranged in the body components, or in proximity to the body components, to monitor the operations of the body components. The sensors 106 emit signals that include the sensor data 110 describing the body component operations, and the signals may vary appropriately based on the particular body component being monitored. In some implementations, the sensor data 110 is analyzed, by a computing device on the vehicle and/or by remote computing device(s), to identify the presence of a triggering condition based at least partly on the operational state of one or more body components 104, as described in further detail below. Sensors 106 can include, but are not limited to, an analog sensor, a digital sensor, a CAN bus sensor, a magnetostrictive sensor, a radio detection and ranging (RADAR) sensor, a light detection and ranging (LIDAR) sensor, laser sensor, an ultrasonic sensor, an infrared (IR) sensor, a stereo camera sensor, a three-dimensional (3D) camera, an in-cylinder sensor, or a combination thereof.

Sensors 106 can be provided on the vehicle body to evaluate cycles and/or other parameters of various body components. For example, as described in further detail herein, the sensors can detect and measure the particular position or operational state of body components, such as the position of a grabber of the vehicle 102.

In some implementations, the sensor data may be communicated from the sensors to an onboard computing device 132 in the vehicle 102. In some instances, the onboard computing device is an under-dash device (UDU), and may also be referred to as the Gateway. Alternatively, the computing device 132 may be placed in some other suitable location in or on the vehicle. The sensor data 110 may be communicated from the sensors to the onboard computing device 132 over a wired connection (e.g., an internal bus) and/or over a wireless connection. In some implementations, a bus compliant with International Organization of Standardization (ISO) standard 11898 connects the various sensors with the onboard computing device. In some implementations, a Controller Area Network (CAN) bus connects the various sensors with the onboard computing device. For example, a CAN bus compliant with ISO standard 11898 can connect the various sensors with the onboard computing device. In some implementations, the sensors may be incorporated into the various body components. Alternatively, the sensors may be separate from the body components. In some implementations, the sensors digitize the signals that communicate the sensor data before sending the signals to the onboard computing device, if the signals are not already in a digital format.

The analysis of the sensor data 110 is performed at least partly by the onboard computing device 132, e.g., by processes that execute on the processor(s) 114. For example, the onboard computing device 132 may execute processes that perform an analysis of the sensor data 110 to determine the current position of the body components, the grabber position. In some implementations, an onboard program logic controller or an onboard mobile controller perform analysis of the sensor data 110 to determine the current position of the body components 104.

The onboard computing device 132 can include one or more processors 114 that provide computing capacity, data storage 166 of any suitable size and format, and network interface controller(s) 118 that facilitate communication of the device 132 with other device(s) over one or more wired or wireless networks.

In some implementations, a vehicle includes a body controller that manages and/or monitors various body components of the vehicle. The body controller of a vehicle can be connected to multiple sensors in the body of the vehicle. The body controller can transmit one or more signals over a CAN network or a J1939 network, or other wiring on the vehicle, when the body controller senses a state change from any of the sensors. These signals from the body controller can be received by the onboard computing device 132 that is monitoring the CAN network or the J1939 network.

In some implementations, the onboard computing device is a multi-purpose hardware platform. The device can include a UDU (Gateway) and/or a window unit (WU) (e.g., a device with cameras, speakers, and/o microphones) to record video and/or audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2c lines(s), and so forth, I/O ports, a wireless chipset, a global positioning system (GPS) chipset, a real-time clock, a micro SD card, an audio-video encoder and decoder chipset, and/or external wiring for CAN and for I/O. The device can also include temperature sensors, battery and ignition voltage sensors, motion sensors, CAN bus sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2c lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

In some implementations, one or more cameras 112 can be mounted on the vehicle 102 or otherwise present on or in the vehicle 102. The camera(s) 112 each generate image data 128 that includes one or more images of a scene external to and in proximity to the vehicle 102. In some implementations, one or more cameras 112 are arranged to capture image(s) and/or video of a container 130 before, after, and/or during the operations of body components 104 to engage and empty a container 130. For example, for a side loading vehicle, the camera(s) 112 can be arranged to image objects to the side of the vehicle, such as a side that mounts the ASL to lift containers. In some implementations, camera(s) 112 can capture video of a scene external to and in proximity to the vehicle 102.

Figure 2A:
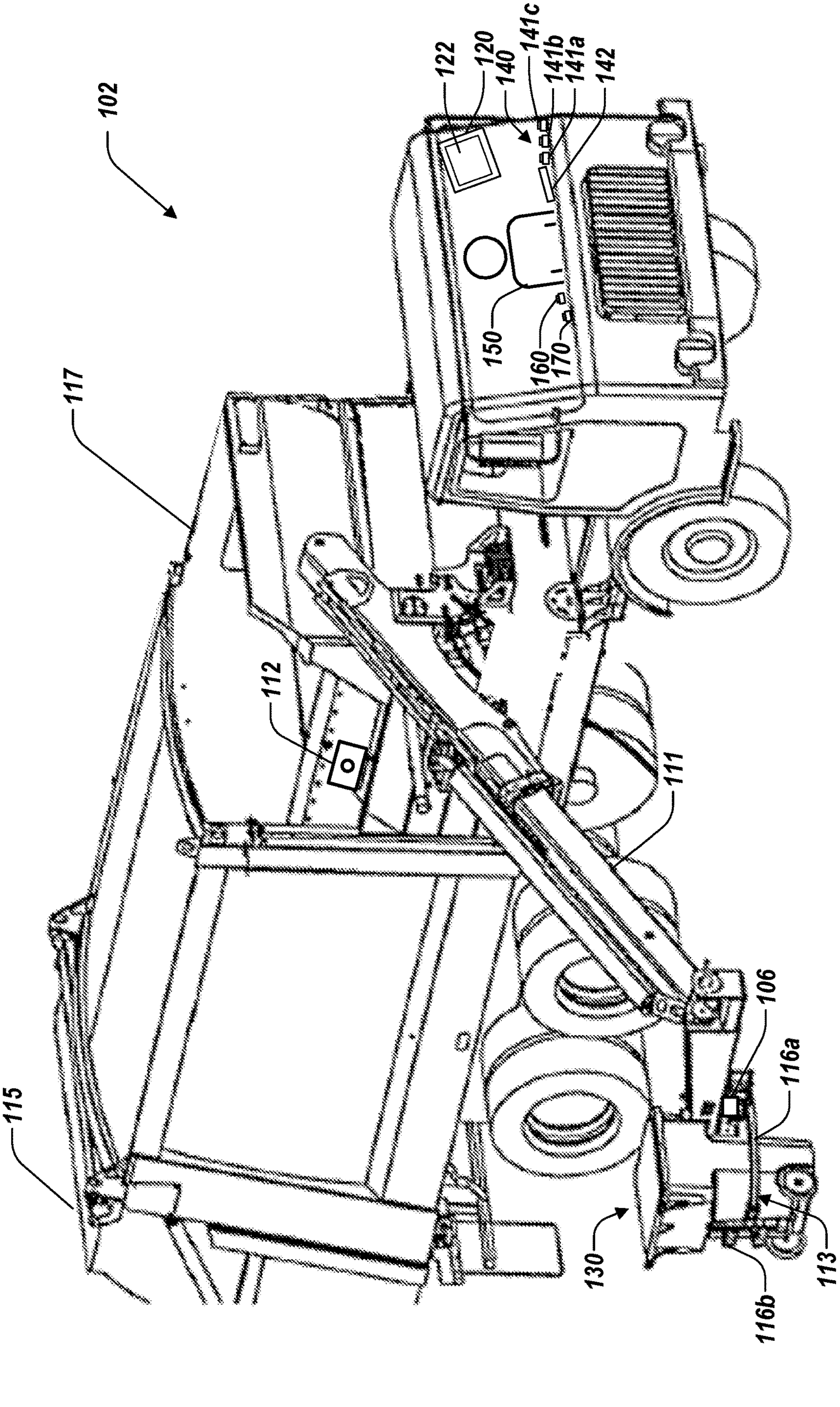
FIGS. 2A-2C depict example schematics of a refuse collection vehicle.
Figure 2B:
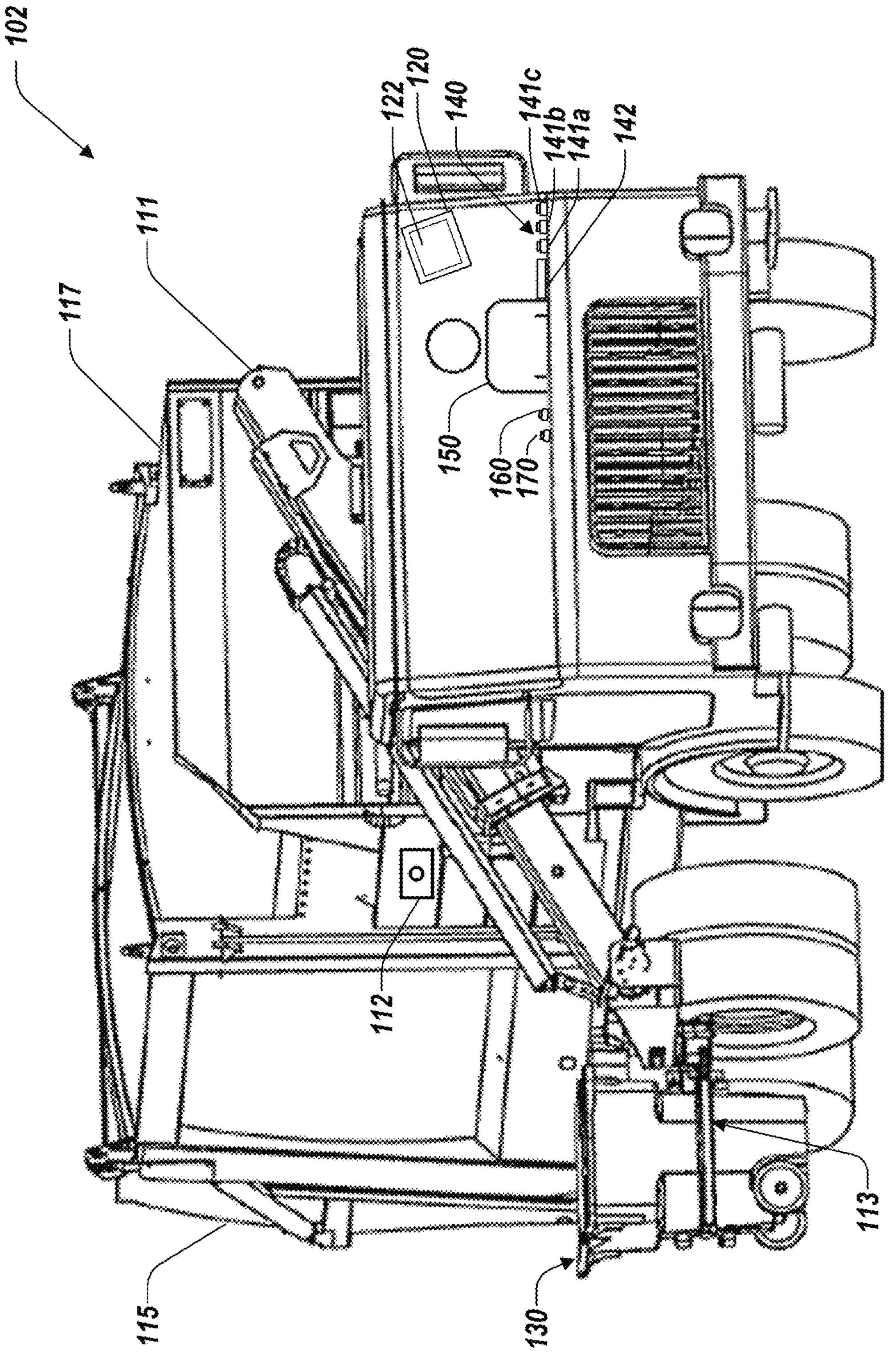
Figure 2C:
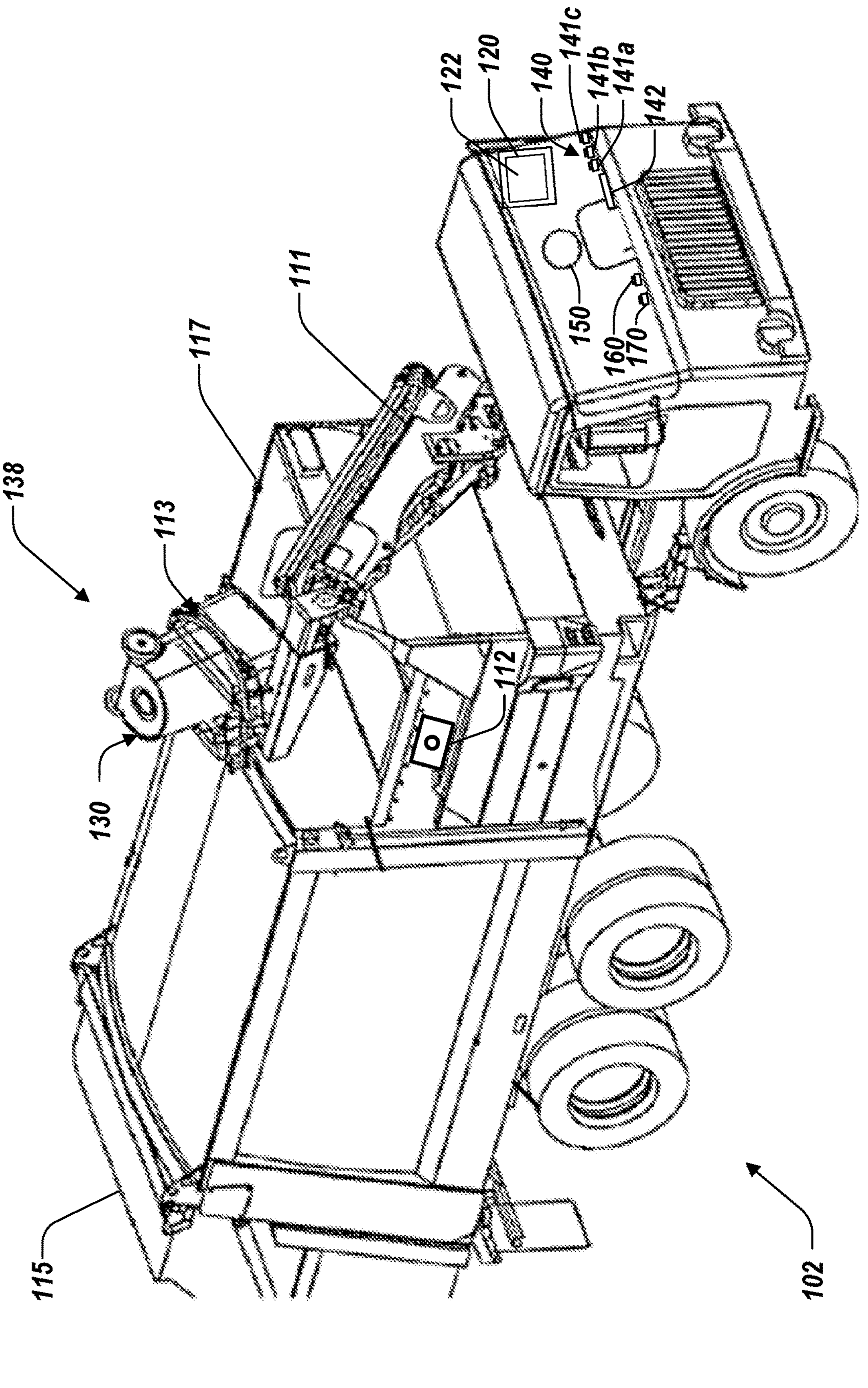

In some implementations, the camera(s) 112 are communicably coupled to a graphical display 120 to communicate images and/or video captured by the camera(s) 112 to the graphical display 120. In some implementations, the graphical display 120 is placed within the interior of the vehicle. For example, as depicted in FIGS. 2A-2C, the graphical display 120 can be placed within the cab of vehicle 102 such that the images and/or video can be viewed by an operator of the vehicle 102 on a screen 122 of the graphical display 120. In some implementations, the graphical display 120 is a heads-up display that projects images and/or video onto the windshield of the vehicle 102 for viewing by an operator of the vehicle 102.

In some implementations, the images and/or video captured by the camera(s) 112 can be communicated to a graphical display 120 of the onboard computing device 132 in the vehicle 102. Images and/or video captured by the camera(s) 112 can be communicated from the camera(s) 112 to the onboard computing device 132 over a wired connection (e.g., an internal bus) and/or over a wireless connection. In some implementations, a J1939 bus or CAN bus connects the camera(s) with the onboard computing device.

In some implementations, the camera(s) are incorporated into the various body components. Alternatively, the camera(s) may be separate from the body components.

FIGS. 2A-2C depict an example schematic of a refuse collection vehicle 102 engaging a refuse container 130 and performing a dump cycle. The refuse collection vehicle 102 includes various body components including, but not limited to: a lift arm 111, a grabber 113, a back gate or tailgate 115, and a hopper 117 to collect refuse for transportation.

As depicted in FIGS. 2A-2C, the vehicle 102 also includes one or more cameras 112. In the examples shown in FIGS. 2A-2C, a camera 112 is positioned to visualize the environment proximate a side of the refuse collection vehicle 102, including a refuse container 130 to be engaged by the vehicle 102. The side view camera 112 can be aligned with a centerline of the grabber 113 to visualize a container 130 engaged by the grabber 113.

The side view camera 112 helps provide the vehicle operator 150 with a clear visual line of sight of a refuse container 130 located to the side of the vehicle 102. For example, images and/or video captured by camera 112 can be provided to a graphical display 120 for display on a screen 122 of the graphical display 120. As shown in FIGS. 2A-2C, a graphical display 120 is placed within the cab of vehicle 102 such that the images and/or video can be viewed on a screen 122 of the display 120 by the operator 150 of the vehicle 102. In some implementations, the graphical display 120 is a heads-up display that projects images and/or video captured by camera 112 onto the windshield of the vehicle 102 for viewing by an operator of the vehicle 102. In some implementations, the images and/or video captured by the camera 112 can be communicated to a graphical display 120 of an onboard computing device in the vehicle 102. Images and/or video captured by the camera 112 can be communicated from the sensors to the graphical display 120, over a wired connection (e.g., an internal bus) and/or over a wireless connection. In some implementations, a network bus (e.g., a J1939 network bus, a CAN network bus, etc.) connects the camera(s) with the onboard computing device 132. The ability to visualize the side of the vehicle 102 via the side view camera 112 and the graphical display 120 may be particularly useful when the refuse container 130 to be engaged is within close proximity of the vehicle 102.

In some implementations, the side view camera 112 is contained within an enclosure. For example, the camera 112 can be contained within a metal enclosure that also includes a light source. Placing the side view camera 112 in an enclosure can help protect the camera 112 from debris.

The vehicle 102 also includes one or more grabber position sensors 106 arranged to detect the position of the grabber 113. For example, the grabber position sensor 106 can be used to detect the relative positioning of the gripper arms **116*a*, 116*b* of the grabber 113. Grabber position sensors 106 for detecting the position of the gripper arms 116*a*, 116*b* can include, but are not limited to, an analog sensor, a digital sensor, a CAN bus sensor, a magnetostrictive sensor, a RADAR sensor, a LIDAR sensor, a laser sensor, an ultrasonic sensor, an infrared (IR) sensor, a stereo camera sensor, a three-dimensional (3D) camera, an in-cylinder sensor, or a combination thereof. In some examples, the sensor 106 can be used to detect a distance between the gripper arms 116*a*, 116. In some examples, the sensor 106 includes one or more sensors positioned in one or more rotary actuators coupled to the gripper arms 116*a*, 116*b* and is configured to detect angular movement and positioning of the gripper arms 116*a*, 116*b* relative to a grabber beam (such as grabber beam 248 of FIGS. 3A-3C**).

In some examples, the sensor 106 for detecting the relative positioning of the gripper arms **116*a*, 116*b* is coupled to a cylinder 240 that is coupled to the grabber 113. For example, the sensor 106 can detect the relative position of the gripper arms 116*a*, 116*b* based on the amount of travel of a piston 242 coupled to the gripper arms 116, 116*b* from the cylinder 240. In some implementations, the sensor 106 for detecting the distance between the gripper arms 116*a*, 116*b* is located inside a cylinder 240 coupled to the grabber 106. In some implementations, the sensor 106 for detecting the distance between the gripper arms 116***a*, 116*b* is located on the outside of a housing containing a cylinder 240 coupled to the grabber 106.

As depicted in FIGS. 2A-2C, one or more controllers 140, 142 are provided to control mechanical components of the vehicle. For example, as will be described in detail herein, controller 140 and controller 142 are provided to control movement of the grabber 113.

As shown in FIG. 2A, a refuse container 130 can be engaged by the grabber 113 of the refuse collection vehicle 102. The grabber 113 includes two gripper arms 116*a*, 116*b* that are configured to encapsulate and apply pressure to a refuse container 130 to engage the refuse container 130. As explained in further detail herein, the relative positioning of the gripper arms 116*a*, 116*b* can be adjusted to engage a refuse container 130.

As shown in FIG. 2A, engaging the refuse container 130 includes extending the lift arm 111 of the vehicle 102 outward from the vehicle 102 until the grabber 113 is in a position to engage the refuse container 130. Once the grabber 113 is in close proximity to the refuse container 130, the distance between the gripper arms 116*a*, 116*b* is reduced to engage and apply pressure to the refuse container 130. In some implementations, the one or more gripper arms 116*a*, 116*b* continue to move inward until a threshold pressure is applied to the refuse container.

As depicted in FIGS. 2B and 2C, after the refuse container 130 is engaged by the grabber 113, the engaged refuse container 130 is lifted to a dump position 138 and the contents of the refuse container 130 are dumped into the hopper 117 of the refuse collection vehicle 102. The grabber 113 applies pressure to the refuse container 130 throughout the process of lifting the container 130 and dumping the contents of the container 130 to ensure that the container 130 is not prematurely dropped.

After the contents of the engaged refuse container 130 are dumped into the hopper 117 of the refuse collection vehicle 102, the lift arm 111 is lowered to return the refuse container 130 to the ground (or another surface on which the refuse container was positioned when initially engaged by the grabber 113). Once the refuse container 130 has been lowered to the ground or other placement surface, the gripper arms 116*a*, 116*b* move away from each other to release the refuse container 130 from the grabber 113.

Figure 3A:
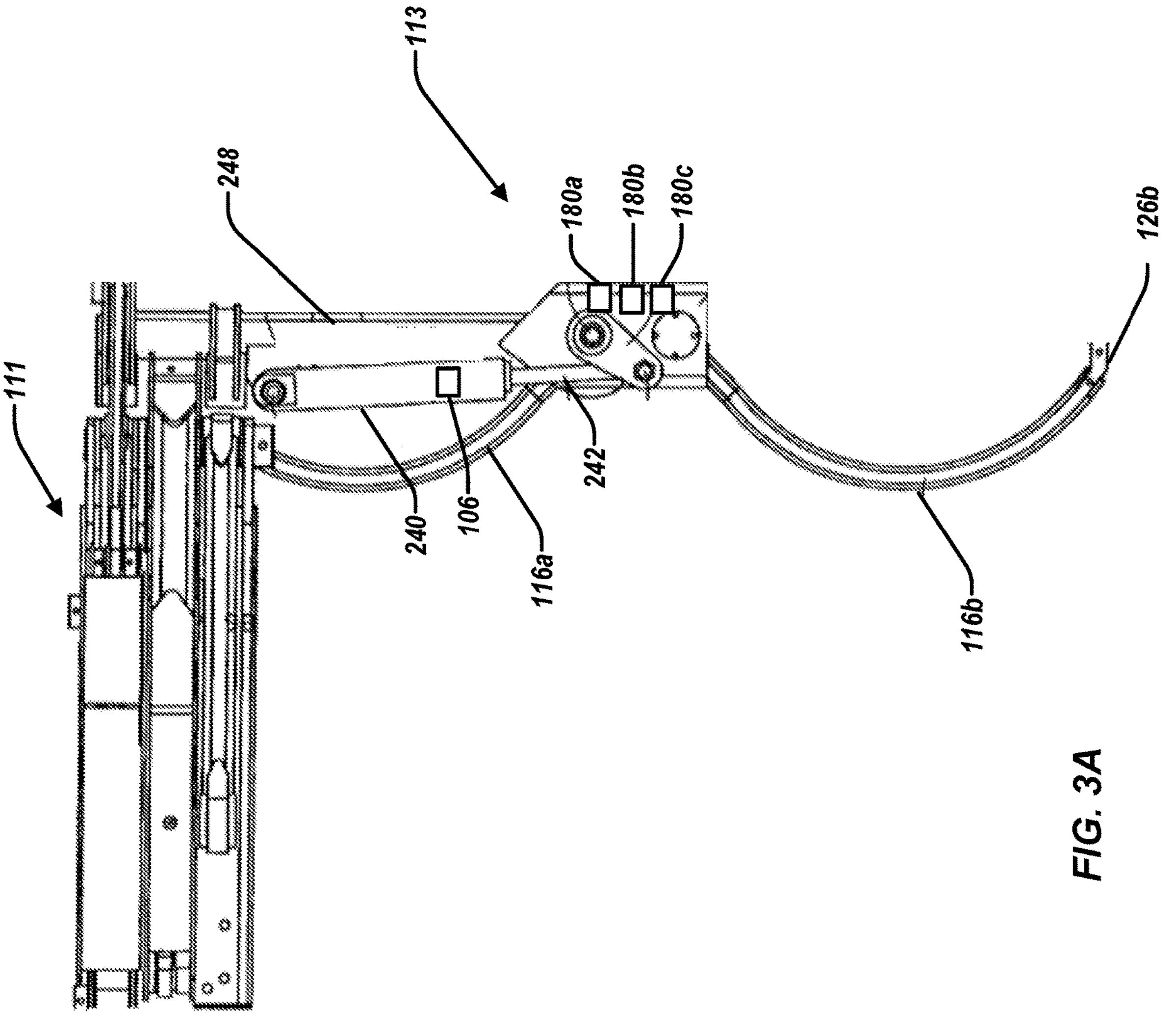
FIGS. 3A-3C depict an example grabber of a refuse collection vehicle in various positions.
Figure 3B:
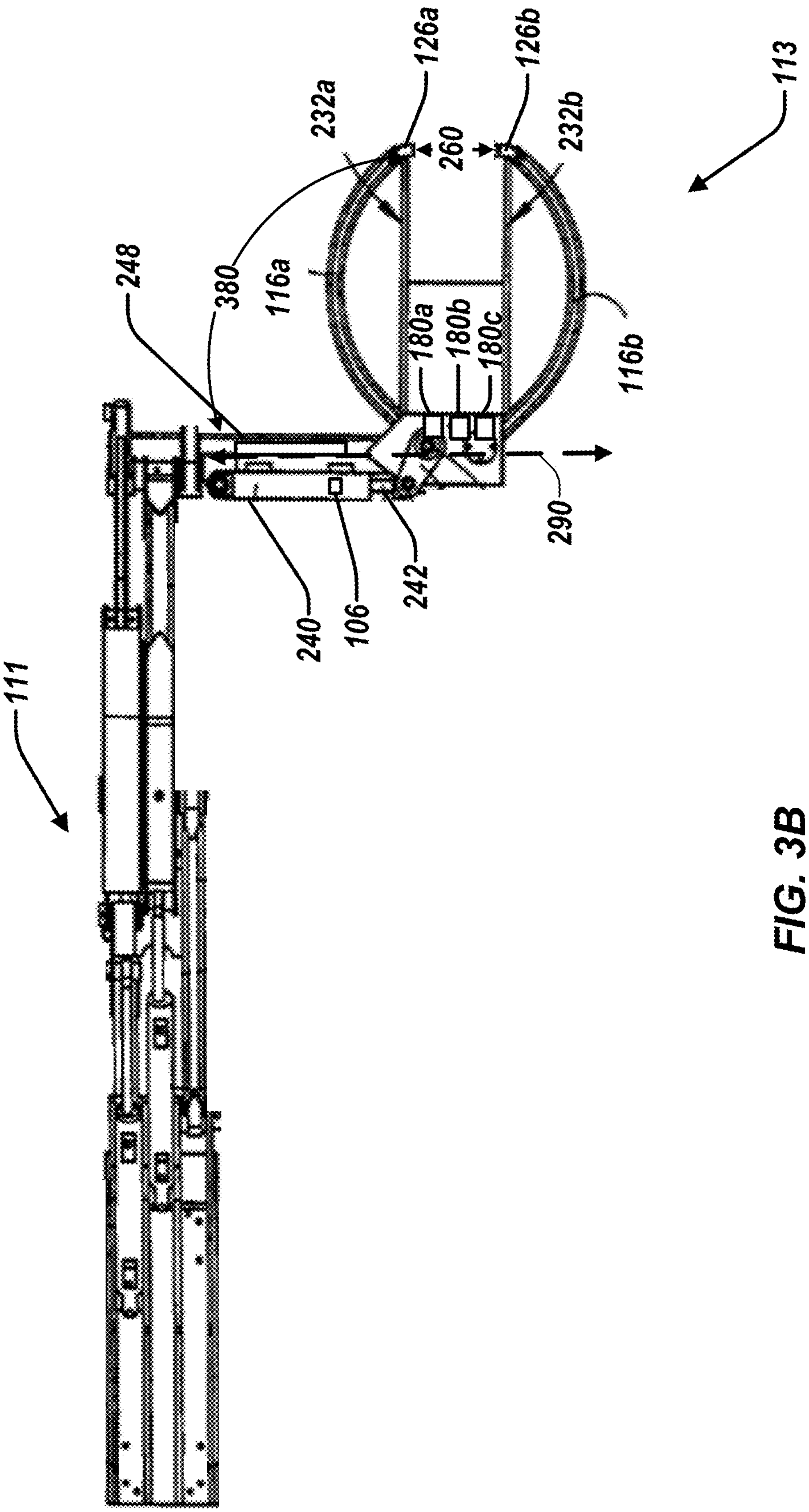
Figure 3C:
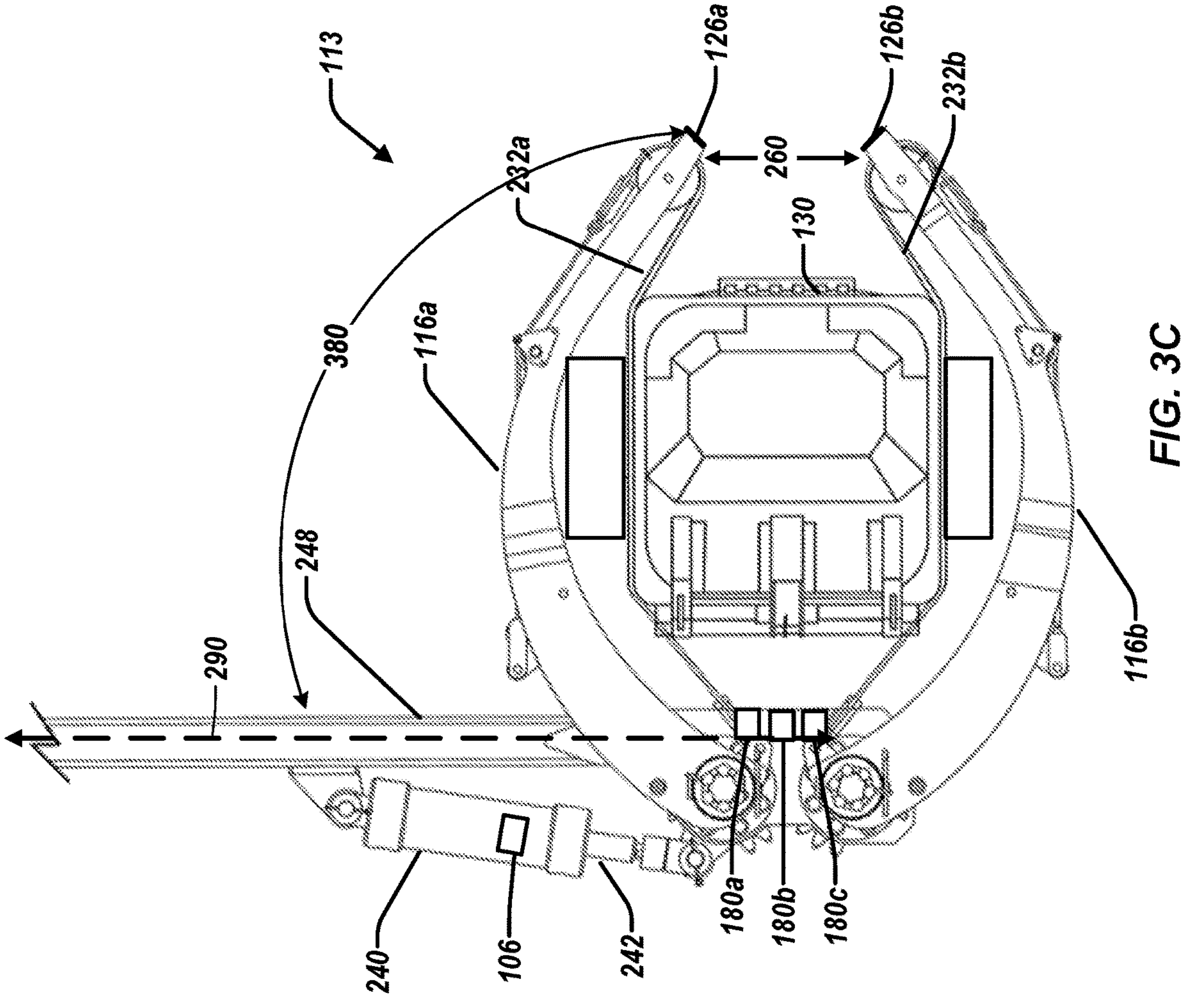

As previously discussed, the refuse collection vehicle 102 uses a grabber 113 to engage a refuse container 130. FIGS. 3A-3C depict top views of an example grabber 113. As depicted in FIG. 3A, the grabber 113 includes two opposing gripper arms 116*a*, 116*b*. In some examples, as depicted in FIGS. 3B and 3C, the grabber 113 also includes belts 232*a*, 232*b* attached to each the gripper arms 116*a*, 116*b*. The belts 232*a*, 232*b* allow for improved engagement between the grabber 113 and a refuse container 130 and allow for engagement of refuse containers 130 of various sizes. In some examples, belts 232*a*, 232*b* include one or more rubber belts. FIG. 3C depicts a refuse container 130 engaged by the grabber 113.

The relative positioning of the gripper arms 116*a*, 116*b* can be adjusted to engage a variety of refuse containers. For example, the distance 260 between the end 126*a*, 126*b* of each of the gripper arms 116*a*, 116*b* can be adjusted by rotating the gripper arms 116*a*, 116*b* inward or outward between an open position and a closed position.

In some examples, the relative positioning of the gripper arms 116*a*, 116*b* is determined based on a distance 260 between the gripper arms 116*a*, 116*b*. In some implementations, the relative positioning of the gripper arms 116*a*, 116*b* is determined based on a distance 260 between an end 126*a* of the first gripper arm 116*a* opposite the attachment of the gripper arm 116*a* to the lift arm 111 and an end 126*b* of the second gripper arm 116*b* opposite the attachment of the gripper arm 116*b* to the lift arm 111 (i.e., the distance between the exposed ends 126*a*, 126*b* of the gripper arms 116*a*, 116*b*). In some implementations, as described in further detail herein, the relative positioning of the gripper arms 116*a*, 116*b* is determined based on an amount of extension of a piston 242 attached to the gripper arms 116*a*, 116*b* from a cylinder 240 coupled to the piston 242. In some implementations, the relative positioning of the gripper arms 116*a*, 116*b* is based on the angle 380 between the ends 126*a*, 126*b* of the gripper arms 116*a*, 116*b* and the longitudinal axis 290 of the grabber beam 248 of the grabber 113.

As previously discussed, the relative positioning of the gripper arms 116*a*, 116*b* is measured by a grabber position sensor 106 coupled to the refuse collection vehicle 102. In some examples, sensor 106 includes one or more sensors coupled to one or more rotary actuators coupled to the gripper arms 116*a*, 116*b* and is configured to detect angular movement of the gripper arms 116*a*, 116*b*.

In some examples, an assembly that includes a cylinder 240 and a piston 242 moves the gripper arms 116*a*, 116*b* between an open position and a closed position. For example, extension of the piston 242 outward from the cylinder 240 will cause the gripper arms 116*a*, 116*b* to move inward towards a closed position and reduces the distance 260 between the gripper arms 116*a*, 116*b*. Retraction of the piston 242 into the cylinder 240 causes the gripper arms 116*a*, 116*b* to move outward towards an open position and increases the distance 260 between the gripper arms 116*a*, 116*b*. In some examples, grabber position sensor 106 is coupled to the cylinder 240 and measures the relative positioning of the gripper arms 116*a*, 116*b* based on the amount of extension of the piston 242 from the cylinder 240.

Operator 150 can use a one or more controllers 140, 142 to adjust a target relative positioning of the gripper arms 116*a*, 116*b* of the grabber 113. For example, a target relative positioning of the gripper arms 116*a*, 116*b* can be adjusted between a fully open position, as shown in FIG. 3A, and a fully closed position, as shown in FIG. 3B, in defined increments using a controller (such as controllers 140, 142). In some implementations, the fully open position corresponds to 0 inches of piston 242 extension from the cylinder 240 and the fully closed position corresponds to 8 inches of piston 242 extension from the cylinder 240. In some implementations, the angle 380 between each of the ends 126*a*, 126*b* of the gripper arms 116*a*, 116*b* and the longitudinal axis 290 of the grabber beam 248 ranges from 0 degrees in the fully open position to 90 degrees in the fully closed position. In some examples, the angle 380 of the gripper arms 116*a*, 116*b* relative to the longitudinal axis 290 of the grabber beam 248 can be adjusted in increments of 1.125 degrees of angular movement.

Figure 4:
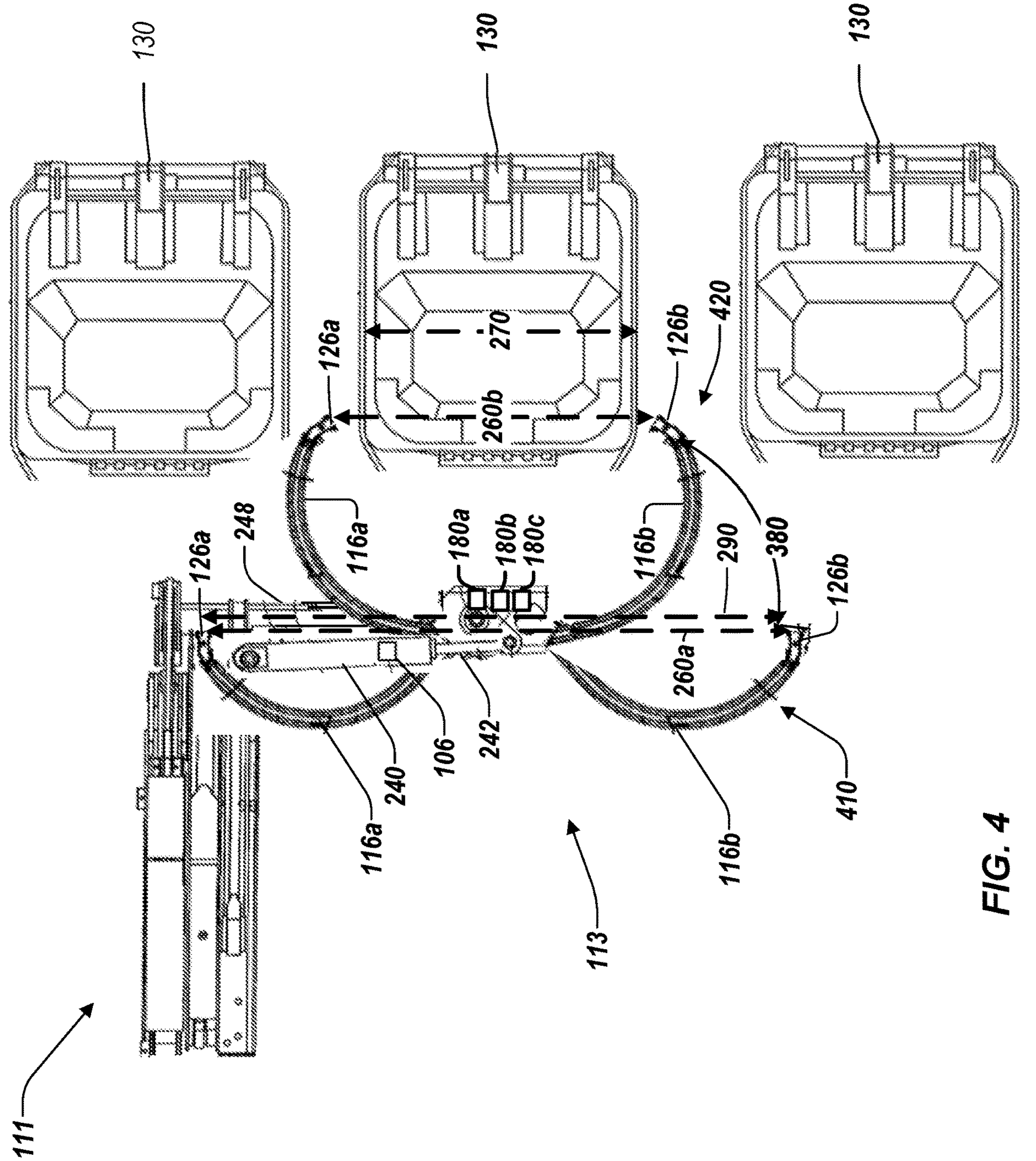
FIG. 4 depicts an example grabber of a refuse collection vehicle engaging a refuse container.

FIG. 4 depicts movement of the gripper arms 116*a*, 116*b* of a grabber 113 of a refuse collection vehicle 102 from a first relative positioning to a second relative positioning. As shown in FIG. 4, upon approaching a refuse container 130 to be engaged by the grabber 113, the grabber 113 is in a first relative positioning 410 with the gripper arms 116*a*, 116*b* of the grabber 113 spaced apart by a first distance 260*a*. An operator can use a controller (such as controller 140 or controller 142 of FIGS. 2A-2C) to provide a second relative positioning 420 of the gripper arms 116*a*, 116*b* with an adjusted distance 260*b* between the gripper arms 116*a*, 116*b* that is slightly larger than the width 270 of the refuse container 130.

In some examples, the grabber 113 is moved from the first relative positioning 410 to the second relative positioning 420 in response a signal received by an onboard computing device 132 of the vehicle 102. For example, the grabber 113 can be moved from the first relative positioning 410 to the second relative positioning 420 in response an onboard computing device receiving a signal indicating that the lift arm 111 of the vehicle has been extended to engage a refuse container 130.

Changes in the relative positioning of the gripper arms 116*a*, 116*b* and the distance 260 between the gripper arms 116*a*, 116*b* is measured by the grabber position sensor 106. In some implementations, a current relative positioning of the gripper arms 116*a*, 116*b* is determined based on an amount of extension of piston 242 from cylinder 240, as detected by sensor 106.

In some implementations, a target relative positioning of the gripper arms 116*a*, 116*b* can be set and adjusted using one or more push button controls 141*a*, 141*b*, 141*c* of the controller 140. In some examples, button controls 141*a*, 141*b*, 141*c* are communicably coupled to the cylinder 240 and piston 242 assembly coupled to the grabber 113 such that the button controls 141*a*, 141*b*, 141*c* control the amount extension and retraction of the piston 242 from the cylinder 240 in the target relative positioning, which controls the movement of the gripper arms 116*a*, 116*b*. In some implementations, a first push button 141*a* is configured to adjust a target relative positioning to reduce the amount of extension of the piston 242 from the cylinder 240 in the target relative positioning of the gripper arms 116*a*, 116*b*. In some examples, a second push button 141*b* is configured to adjust the target relative positioning to increase the amount of extension of the piston 242 from the cylinder 240 in the target relative positioning of the gripper arms 116*a*, 116*b*.

In some examples, each time the operator presses a push button 141*a*, 141*b*, a target relative positioning of the gripper arms 116*a*, 116*b* is adjusted by an incremental amount. In some examples, the amount of piston 242 extension from the cylinder 240 in the target relative positioning can be adjusted in increments of 0.1 inches in response to engaging a button control 141*a*, 141*b*, which corresponds to 1.125 degrees of angular movement of the gripper arms 116*a*, 116*b* relative to the longitudinal axis 290 of the grabber beam 248. For example, if the incremental change corresponds to 0.1 inches of piston 242 travel and 1.125 degrees of angular movement of the gripper arms 116*a*, 116*b* relative to the grabber beam 248, an operator can press the first button 141*a* three times to reduce the amount of extension of the piston 242 from the cylinder in the target relative positioning by 0.3 inches, resulting in a 3.375 degrees decrease in the angle 380 between the gripper arms 116*a*, 116*b* and the longitudinal axis 290 of the grabber beam 248 and an increase in the distance 260 between the ends 126*a*, 126*b* of the gripper arms 116*a*, 116*b* in the target relative positioning. In some examples, the amount of piston 242 extension from cylinder 240 in the target relative positioning can be increased or decreased in increments in a range of 0.1 inches to 8 inches using push button controls 141*a*, 141*b*. Similarly, if the incremental change corresponds to 0.1 inches of piston 242 travel, an operator can press the second button 141*b* three times to increase the amount of extension of the piston 242 from the cylinder in the target relative positioning by 0.3 inches, resulting in a 3.375 degree increase in the angle 380 between the gripper arms 116*a*, 116*b* and the longitudinal axis 290 of the grabber beam 248 and a decrease in the distance 260 between the ends 126*a*, 126*b* of the gripper arms 116*a*, 116*b* in the target relative positioning.

In some implementations, the buttons 141*a*, 141*b* can be used to adjust the target relative positioning of the grabber 113 continuously, rather than in defined increments. For example, in some implementations, an operator 150 can press and hold the first push button 141*a* to update the target relative positioning of the gripper arms 116*a*, 116*b* such that the setting for the distance 260 between the gripper arms 116*a*, 116*b* in the target relative positioning will be continuously increased until the operator 150 releases the button 141*a*. Similarly, an operator 150 can press and hold the second push button 141*b* to update target relative positioning of the gripper arms 116*a*, 116*b* such that the setting for the distance 260 between the gripper arms 116*a*, 116*b* in the target relative positioning will be continuously decreased until the operator 150 releases the button 141*a*. In some examples, an operator 150 can press and hold the first push button 141*a* to update the target relative positioning of the gripper arms 116*a*, 116*b* such that the setting for the amount of piston 242 extension in the target relative positioning will be continuously decreased until the operator 150 releases the button 141*a*. In some examples, an operator 150 can press and hold the second push button 141*b* to update the target relative positioning of the gripper arms 116*a*, 116*b* such that the setting for the amount of piston 242 extension in the target relative positioning will be continuously increased until the operator 150 releases the button 141*b*.

As depicted in FIG. 2A-2C, a third push button control 141*c* can be provided that allows an operator to reset the target relative positioning of the gripper arms 116*a*, 116*b* to a baseline positioning. In some implementations, the baseline positioning includes an extension of the piston 242 from the cylinder in a range of 0 inches to 8 inches of extension, which corresponds to a baseline angle 380 between the gripper arms 116*a*, 116*b* and the longitudinal axis 290 of the grabber beam 248 in a range of 0 degrees to 90 degrees. In response to an operator engaging the third push button 141*c*, the target relative positioning of the gripper arms 116*a*, 116*b* is automatically adjusted to the baseline relative positioning. For example, if the baseline positioning includes an amount of piston 242 extension of 3 inches, and the amount of piston 242 extension for the current target relative positioning is 2 inches, engaging the third push button 141*c* will cause the target relative positioning to be updated to have an amount of piston 242 extension equal to 3 inches. In some implementations, the operator 150 can select or adjust the baseline positioning using a controller, such as push buttons 141*a* and 141*b*.

In some examples, the target relative positioning provided by the operator 150 using controller 140 corresponds with a spearing positioning, such that the gripper arms 116*a*, 116*b* are positioned in the target relative positioning provided by the operator 150 using controller 140 when a spearing function of the grabber 113 is engaged. In some examples, the push buttons 141*a*, 141*b*, 141*c* of controller 140 may be utilized by an operator 150 to provide a target relative positioning of the gripper arms 116*a*, 116*b* of the grabber 113 for when a spearing mode for the grabber 113 is engaged. In some examples, when the spearing mode is turned on, the gripper arms 116*a*, 116*b* are automatically positioned to the target relative positioning selected by the operator using push buttons 141*a*, 141*b*, 141*c* in response to a signal received by the onboard computing device 132, such as a signal received by the onboard computing device 132 indicating that the lift arm 111 is being extended to engage a refuse container 130. In some examples, when the spearing mode is turned on, the gripper arms 116*a*, 116*b* are automatically positioned to the target relative positioning selected by the operator 150 using push buttons 141*a*, 141*b*, 141*c* in response to the lift arm 111 extending to engage a refuse container 130. In some examples, when the spearing mode is turned off, the gripper arms 116*a*, 116*b* are not automatically repositioned in response to the lift arm 111 extending to engage a refuse container 130.

In some examples, in response to receiving a signal indicating that the lift arm 111 is being extended to engage a refuse container 130, an onboard computing device 132 receives data from the grabber position sensor 106 indicating the current relative positioning of the grabber 113. Based on the current positioning of the grabber 113 and the target relative positioning for spearing mode provided by the operator 150 using push button 141*a*, 141*b*, 141*c* of controller 140, in response to receiving the signal that the lift arm 111 is being extended to engage a refuse container 130, the onboard computing device 132 sends a signal to extend or retract the piston 242 until the relative positioning of the grabber 113, as detected by sensor 106, is equal to the target relative positioning provided by the operator 150 using controller 140. For example, based on the current positioning of the grabber 113 and the target relative positioning provided by the operator 150 using controller 140, in response to receiving the signal that the lift arm 111 is being extended to engage a refuse container 130, the onboard computing device 132 sends a signal to extend or retract the piston 242 until the amount of extension of the piston 242 is equal to the amount of extension corresponding with target relative positioning provided by the operator 150 using controller 140.

In some implementations, a push button 170 is provided to turn on and turn off a spearing mode of the grabber 113. For example, in response to an operator manually engaging push button 170, the spearing mode of the grabber 113 is turned on and the relative positioning the gripper arms 116*a*, 116*b* of the grabber 113 is automatically adjusted to the target relative positioning for spear mode provided by the operator 150 using push buttons 111, 141*b*, 141*c* in response to the lift arm 111 extending to engage a refuse container 130.

In some examples, manually engaging the push button 170 a second time turns off the spear mode such that the gripper arms 116*a*, 116*b* are not automatically repositioned to the target relative positioning for spear mode selected by the operator using push buttons 111, 141*b*, 141*c* in response to the lift arm 111 extending to engage a refuse container 130.

In some implementations, the push buttons 141*a*, 141*b*, 141*c*, 170 are provided as spring-loaded, momentary contact buttons. In some examples, push buttons 141*a*, 141*b*, 141*c*, 170 are provided as potted and sealed push buttons with finger guards. In some examples, the push buttons 141*a*, 141*b*, 141*c*, 170 for adjusting the target relative positioning of the grabber 113 are integrated into a dashboard of the cab of the refuse collection vehicle. In some implementations, the push buttons 141*a*, 141*b*, 141*c*, 170 for adjusting the target relative positioning of the grabber 113 are integrated into a joystick. For example, one or more of push buttons 111, 141*b*, 141*c*, 170 for adjusting grabber 113 target relative positioning can be incorporated into a joystick for controlling lift arm 111 movement.

In some examples, the target relative positioning of the gripper arms 116*a*, 116*b* can be adjusted to accommodate a specific size of refuse container 130. For example, a controller 142 for controlling the grabber 113 can store one or more grabber 113 target relative positionings associated with one or more sizes (i.e., volumes) of refuse containers. In some examples, the stored positioning corresponding to each refuse container size includes a distance between gripper arms 116*a*, 116*b* that is slightly larger than the width 270 of the corresponding sized refuse container 130. For example, for a 48-gallon refuse container having a width of 47 inches, the controller 142 stores a target relative positioning that includes a gripper arm distance 260 that is slightly larger than the 47 inch container width. For example, in some implementations, the stored positioning corresponding to each refuse container size includes a distance between gripper arms 116*a*, 116*b* that four inches larger than the width 270 of the container. In some implementations, an operator 150 may adjust the stored positioning and select the distance between the gripper arms 116*a*, 116*b* for the stored positioning corresponding to a refuse container size. In some examples, each of the stored positionings include an amount of piston 242 travel corresponding to the stored distance between the gripper arms 116*a*, 116*b* of the stored positioning corresponding to each refuse container 130 size.

Using controller 142, an operator can select the size of refuse container 130 to be engaged by the refuse collection vehicle 102. In response to the operator's selection of the container size, the target relative positioning of the gripper arms 116*a*, 116*b* is automatically adjusted to the stored positioning associated with selected refuse container size. For example, if an operator selects a 48-gallon refuse container using the controller 142, the target relative positioning of the gripper arms 116*a*, 116*b* will automatically be adjusted to the stored positioning for 48-gallon refuse containers. For example, if the amount of piston 242 extension in the current target relative positioning is 2 inches, and the stored positioning for a 48-gallon refuse container includes a distance 260 between the gripper arms 116*a*, 116*b* corresponding to 3 inches of piston 242 extension, a selection of a 48-gallon refuse container using controller 142 will cause the amount of piston 242 extension in the target relative positioning to be adjusted to 3 inches.

Figure 5:
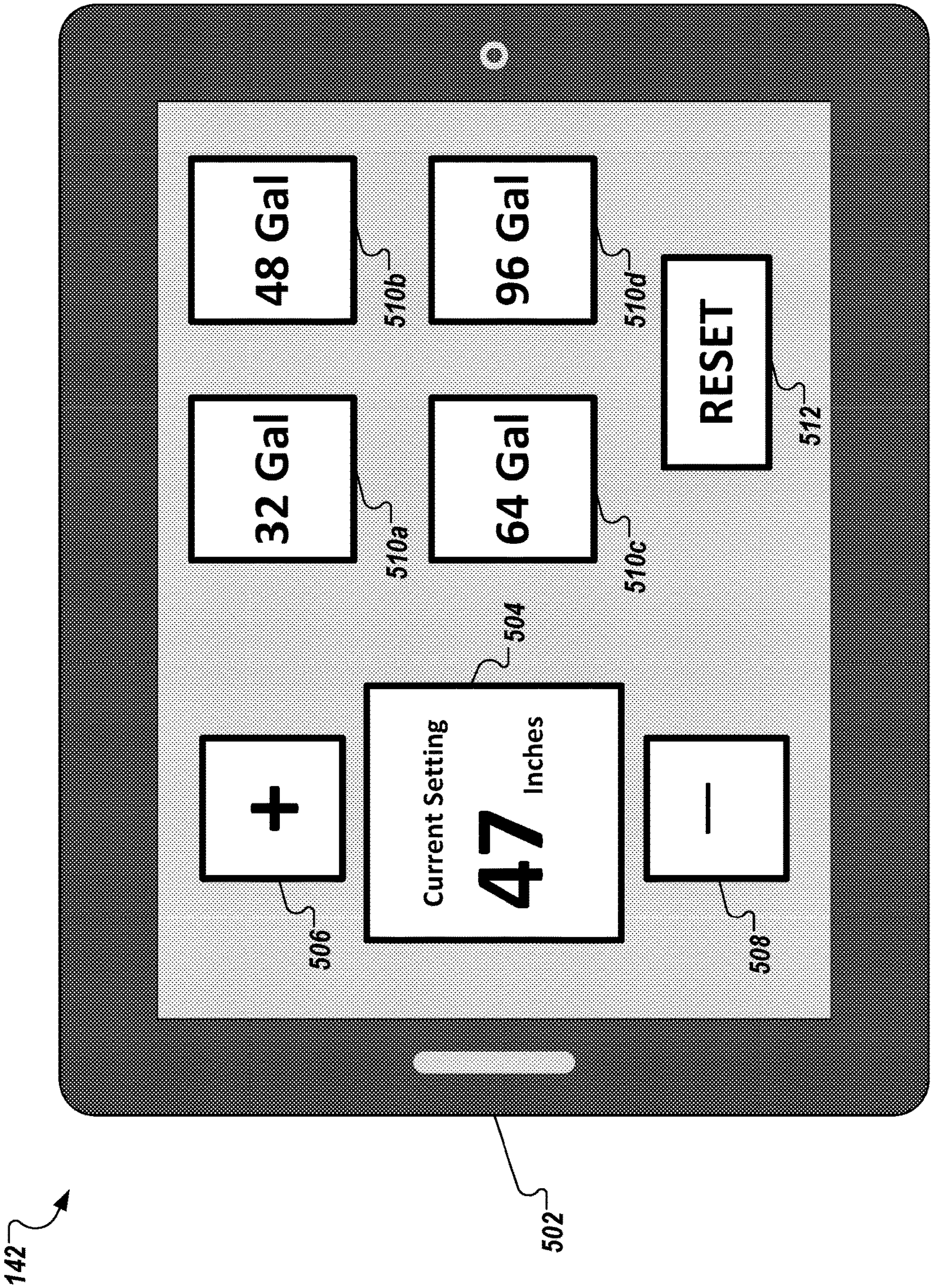
FIG. 5 depicts an example controller interface for controlling a grabber.

FIG. 5 depicts an example controller 142 for adjusting the target relative positioning of the gripper arms 116*a*, 116*b* of a grabber 113 of a refuse collection vehicle 102. As depicted in FIG. 5, the controller 142 may be provided as a touchscreen display 502 displaying a graphical user interface (GUI) having one or more control elements 506, 508, 510, 512. Each of the control elements 506, 508, 510, 512 can be used to adjust the distance 260 between the gripper arms 116*a*, 116*b* of a grabber 113 and/or the amount of extension of piston 242 in the target relative positioning. As shown in FIG. 5, the GUI of the controller 142 also includes a display element 504 that displays the selected distance 260 between the gripper arms 116*a*, 116*b* for the target relative positioning.

The GUI of the controller 142 includes a first control element 506 for increasing the distance 260 between the gripper arms 116*a*, 116*b* in the target relative positioning of the gripper arms 116*a*, 116*b*. In some examples, each time an operator selects the first control element 506, the amount of extension of a piston 242 coupled to the gripper arms 116*a*, 116*b* from a cylinder 240 in the target relative positioning is decreased by a defined incremental distance, resulting in an increase in the distance 260 between the gripper arms 116*a*, 116*b* in the target relative positioning. For example, if the incremental amount piston 242 travel is 0.1 inches, which corresponds to 1.125 degrees of angular movement of the gripper arms 116*a*, 116*b* relative to the longitudinal axis 290 of the grabber beam 248, an operator can select the first control element 506 three times to decrease the extension of the piston 242 from the cylinder by 0.3 inches in the target relative positioning, resulting in a 3.375 degrees decrease in the angle 380 between the gripper arms 116*a*, 116*b* and the longitudinal axis 290 of the grabber beam 248 and an increase in the distance 260 between the ends 126*a*, 126*b* of the gripper arms 116*a*, 116*b* in the target relative positioning. In some examples, the amount of piston 242 extension from cylinder 240 in the target relative positioning can be decreased in increments in a range of 0.1 inches to 8 inches using control element 506. In some examples, the total amount of piston 242 extension from the cylinder 240 can range from 0 inches of extension to 8 inches of extension, corresponding to a range of angles 380 between the gripper arms 116*a*, 116*b* and the longitudinal axis 290 of the grabber beam 248 of 0 degrees to 90 degrees.

The GUI of the controller 142 also includes a second control element 508 for decreasing the distance 260 between the gripper arms 116*a*, 116*b* in the target relative positioning of the gripper arms 116*a*, 116*b*. In some examples, the amount of extension of a piston 242 coupled to the gripper arms 116*a*, 116*b* in the target relative positioning is increased by a defined incremental distance, resulting in a decrease in the distance 260 between the gripper arms 116*a*, 116*b* in the target relative positioning. For example, if the incremental piston 242 travel is 0.1 inches, which corresponds to 1.125 degrees of angular movement of the gripper arms 116*a*, 116*b* relative to the grabber beam 248, an operator can press the second control element 508 three times to increase the extension of the piston 242 from the cylinder 240 by 0.3 inches in the target relative positioning, resulting in a 3.375 degrees increase in the angle 380 between the gripper arms 116*a*, 116*b* and the longitudinal axis 290 of the grabber beam 248 and a decrease in the distance 260 between the ends 126*a*, 126*b* of the gripper arms 116*a*, 116*b* in the target relative positioning. In some examples, the amount of piston 242 extension from cylinder 240 in the target relative positioning can be increased in increments in a range of 0.1 inches to 8 inches using control element 508. In some examples, the total amount of piston 242 extension from the cylinder 240 can range from 0 inches of extension to 8 inches of extension, corresponding to an angle 380 between the gripper arms 116*a*, 116*b* and the longitudinal axis 290 of the grabber beam 248 ranging from 0 degrees to 90 degrees.

The controller 142 also includes one or more control elements 510 for automatically adjusting the target relative positioning of the gripper arms 116*a*, 116*b* based on a selected refuse container size. As depicted in FIG. 5, control elements 510 each correspond to a particular size of refuse container, as defined by volume. For example, as depicted in FIG. 5, control element 510*a* corresponds to a 32-gallon refuse container, control element 510*b* corresponds to a 48-gallon refuse container, control element 510*c* corresponds to a 64-gallon refuse container, and control element 510*d* corresponds to a 96-gallon refuse container. As previously discussed, controller 142 can store a relative positioning corresponding to each refuse container associated with each control element 510, each stored relative positioning including a gripper arm distance slightly larger than the width of the corresponding refuse container. In some examples, each of the stored relative positionings also include an amount of piston 242 travel corresponding to the stored distance between the gripper arms 116*a*, 116*b* of the stored positioning corresponding to each refuse container 130 size.

In response to an operator's selection of one of control elements 510, the target relative positioning of the gripper arms 116*a*, 116*b* is automatically adjusted to the stored relative positioning associated with the selected control element 510. For example, if an operator 150 selects control element 510*c* corresponding to a 64-gallon refuse container, the target relative positioning of the gripper arms 116*a*, 116*b* will be automatically adjusted to the stored relative positioning associated with control element 510*c*. For example, in response to a selection of control element 510*c*, the target relative positioning, including the amount of piston 242 extension and the distance 260 between gripper arms 116*a*, will be automatically updated to the stored positioning for the 64-gallon refuse container.

As depicted in FIG. 5, the GUI of the controller 142 can also include a reset control element 512 that allows an operator 150 to reset the target relative positioning of the gripper arms 116*a*, 116*b* to a baseline positioning. In response to an operator's 150 selection of the reset control element 512, the current target relative positioning of the gripper arms 116*a*, 116*b* is automatically adjusted to the baseline positioning. For example, if the baseline positioning includes a distance 260 between the gripper arms 116*a*, 116*b* corresponding to 3 inches of piston 242 extension, and the current amount of piston 242 extension in the target relative positioning is 2 inches, a selection of the reset control element 512 will cause the amount of piston 242 extension of the target relative positioning to be increased to 3 inches.

Display element 504 displaying the selected distance 260 between the gripper arms 116*a*, 116*b* for the target relative positioning is automatically updated in response to each adjustment of the target relative positioning of the gripper arms 116*a*, 116*b*. For example, if the current distance 260 between the gripper arms 116*a*, 116*b* for the target relative positioning is 47 inches, and the operator increases the distance 260 between the gripper arms 116*a*, 116*b* for the target relative positioning by an inch using control element 506, display element 504 will be updated to display 48 inches as the distance between the gripper arms 116*a*, 116*b* for the target relative positioning. In some implementations, the display element 504 can be used to display the amount of extension of a piston 242 coupled to the grabber 113 from a cylinder 240 for the target relative positioning. In some examples, display element 504 is automatically updated in response to each adjustment of the amount of extension of piston 242 from cylinder 240 for the target relative positioning. For example, if the current amount of piston 242 extension for the target relative positioning is 2 inches, and an operator 150 uses a control element of controller 142 to increase the amount of piston 242 extension for the target relative positioning by an additional inch, the display element 504 will be updated to display 3 inches as the amount of extension of the piston 242 from the cylinder 240 for the target relative positioning.

In some examples, the target relative positioning provided by the operator 150 using controller 142 corresponds with a spearing positioning, such that the gripper arms 116*a*, 116*b* are positioned in the target relative positioning provided by the operator 150 using controller 142 when a spearing function of the grabber 113 is engaged. In some examples, the control elements 506, 508, 510, 512 may be utilized by an operator 150 to provide a target relative positioning of the gripper arms 116*a*, 116*b* of the grabber 113 for when a spearing mode for the grabber 113 is engaged. For example, the operator 150 can use control elements 506, 508, 510, 512 to select a target relative positioning of the gripper arms 116*a*, 116*b* of the grabber 113, as discussed above, for when the spearing mode of the grabber 113 is turned on. In some examples, when the spearing mode is turned on, the gripper arms 116*a*, 116*b* are automatically positioned to the target relative positioning selected by the operator using control elements 506, 508, 510, 512 in response to a signal received by the onboard computing device 132, such as a signal received by the onboard computing device 132 indicating that the lift arm 111 is being extended to engage a refuse container 130. In some examples, when the spearing mode is turned on, the gripper arms 116*a*, 116*b* are automatically positioned to the target relative positioning selected by the operator using control elements 506, 508, 510, 512 in response to the lift arm 111 extending to engage a refuse container 130. In some examples, when the spearing mode is turned off, the gripper arms 116*a*, 116*b* are not automatically repositioned in response to the lift arm 111 extending to engage a refuse container 130.

In some examples, in response to receiving a signal indicating that the lift arm 111 is being extended to engage a refuse container 130, an onboard computing device receives data from grabber position sensor 106 indicating the current relative positioning of the grabber 113. Based on the current positioning of the grabber 113 and the target relative positioning provided by the user using controller 142, in response to receiving a signal that the lift arm 111 is being extended to engage a refuse container 130, the onboard computing device 132 sends a signal to extend or retract the piston 242 until the relative positioning of the grabber 113, as detected by sensor 106, is equal to the target relative positioning provided by the operator 150 using controller 142. Based on the current positioning of the grabber 113 and the target relative positioning provided by the operator 150 using controller 142, and in response to receiving the signal that the lift arm 111 is being extended to engage a refuse container 130, the onboard computing device 132 sends a signal to extend or retract the piston 242 until the amount of extension of the piston 242, as detected by sensor 106, is equal to the amount of extension corresponding with target relative positioning provided by the operator 150 using controller 142.

In some implementations, the grabber 113 of the vehicle 102 can be automatically positioned to engage the detected refuse container 130. For example, in some implementations, the grabber 113 is automatically positioned to engage a refuse container 130 detected based on one or more images captured by a camera 112 on the vehicle 102 and processed by a computing device (e.g. computing device 132). A computing device can receive one or more images from camera 112 and process the images using machine learning based image processing techniques to detect the presence of a refuse container 130 in the image and determine the width of the detected refuse container 130. For example, a computing device can receive an image from camera 112 and determine, based on machine learning image processing techniques, that the vehicle 102 is positioned within a sufficient distance to engage a refuse container 130. In some implementations, a video feed of the refuse container 130 is provided by the side view camera 112 and transmitted to a computing device for machine learning based image processing techniques to detect the presence of a refuse container 130 in the image and determine the width of the detected refuse container 130. In some examples, the width of the refuse container 130 id determined by processing the image using machine learning techniques to detect two opposing sides of the refuse container 130 and determine the distance between the sides of the refuse container 130. U.S. patent application Ser. No. 16/781,857 filed Feb. 4, 2020 discloses systems and methods for determining the location of a refuse container using image processing techniques. The entire content of U.S. patent application Ser. No. 16/781,857 is incorporated by reference herein.

In response to detecting the presence of a refuse container 130 and determining the width of the container 130 based on image process of an image captured by camera 112, a signal is sent to the computing device 132 of the vehicle 102 to automatically adjust the relative positioning of the gripper arms 116*a*, 116*b*. For example, a signal is sent to the computing device 132 of the vehicle 102 to automatically adjust relative positioning of the gripper arms 116*a*, 116*b* such that the distance 260 between the gripper arms 116*a*, 116*b* is slightly larger than the width of the refuse container 130 determined based on the machine learning image processing of the image of the container 130. For example, upon receiving a signal conveying the width of a refuse container 130 determined based on processing an image of the container 130, an onboard computing device 132 determines the current relative positioning of the gripper arms 116*a*, 116*b* based on data received from grabber position sensor 106, and determines the amount of piston 242 travel required to adjust the relative positioning of the gripper arms 116*a*, 116*b* such that distance between the ends 126*a*, 126*b* of each of the gripper arms 116*a*, 116*b* is slightly larger than the detected width. The gripper arms 116*a*, 116*b* are automatically moved inward or outward, based on the relative positioning of the gripper arms 116*a*, 116*b* and the detected width of the refuse container 130, until the grabber position sensor 106 detects that the distance 260 between the gripper arms 116*a*, 116*b* is slightly larger than the detected width of the refuse container 130. For example, if the detected width 270 of the refuse container is 47 inches and current distance 260 between the gripper arms 116*a*, 116*b* is 45 inches, as determined based on current piston 248 extension, the gripper arms 116*a*, 116*b* will automatically move outward from one another until sensor 106 detects that the distance 260 between the gripper arms 116*a*, 116*b* is slightly larger than 47 inches (e.g., until the distance 260 is equal to 48 inches), as determined based on the detected amount of piston 242 extension.

In some implementations, in response to determining a width 270 of a refuse container 130 based on an image capture by camera 112, the distance 260 between the gripper arms 116*a*, 116*b* will be automatically adjusted to a distance that is approximately four inches larger than the detected width. In some implementations, an operator may adjust the difference in distance between the gripper arms 116*a*, 116*b* and the detected width of the container 130 ("clearance distance"). For example, an operator may set the clearance distance as six inches, and in response to determining a width 270 of a refuse container 130 based on an image capture by camera 112, the distance 260 between the gripper arms 116*a*, 116*b* will be automatically adjusted to a distance that is six inches larger than the detected width.

The automatic positioning of the grabber 113 of the refuse collection vehicle 102 based on processing image(s) of the refuse container 130 by a computing device can be conducted automatically with minimal or no operator involvement. For example, as described above, the relative positioning the gripper arms 116*a*, 116*b* of the grabber can be automatically adjusted without operator input up in response to receiving a signal from a computing device conveying the width of the refuse container 130 as determined by processing an image of the container 130 received from camera 112. In some examples, the relative position of the grabber 113 is automatically adjusted based on receiving data conveying the position of the refuse container 130 and in response to an operator 150 of the vehicle manually engaging a switch to initiate a dump cycle (as depicted in FIGS. 2A-2C). In some implementations, the switch to initiate the dump cycle is provided as one or more foot pedals positioned on the floorboard of the vehicle 102. U.S. patent application Ser. No. 16/781,857 filed Feb. 4, 2020 discloses foot pedals for initiating and controlling a dump cycle. The entire content of U.S. patent application Ser. No. 16/781,857 is incorporated by reference herein.

In some implementations, the vehicle includes one or more container detection sensors 180*a*, 180*b*, 180*c* and the grabber 113 is automatically positioned to engage a refuse container 130 based on data received from the one or more container detection sensors 180*a*, 180*b*, 180*c*. As depicted in FIGS. 3A-3C, the vehicle 102 can include one or more container detection sensors 180*a*, 180*b*, 180*c*. In some implementations, the container detection sensors 180*a*, 180*b*, 180*c* are coupled to the grabber beam 248 of the refuse collection vehicle 102. In some examples, the vehicle 102 includes three refuse container sensors 180*a*, 180*b*, 180*c*. In some implementations, each of the refuse container sensors 180*a*, 180*b*, 180*c* is coupled to the grabber beam 248 proximate the grabber 113 and is positioned at a different angle. For example, a first sensor 180*a* can be positioned perpendicular to a longitudinal axis 290 of the grabber beam 248, a second sensor 180*b* can be positioned at a 30 degree angle relative to the longitudinal axis 290 of the grabber beam 248, and a third sensor 180*c* can be positioned at a 45 degree angle relative to the longitudinal axis 290 of the grabber beam 248. In some implementations, the vehicle 102 includes two refuse container sensors (e.g., sensors 180*a* and 180*c*). Multiple container detection sensors 180*a*, 180*b*, 180*c* can be implemented to provide redundancy in refuse container detection.

In some implementations, the one or more container detection sensors 180*a*, 180*b*, 180*c* are contained within an enclosure. For example, the container detection sensors 180*a*, 180*b*, 180*c* can be contained within a metal enclosure. Placing the container detection sensors 180*a*, 180*b*, 180*c* in an enclosure can help protect the container detection sensors 180*a*, 180*b*, 180*c* from debris.

Container detection sensors 180*a*, 180*b*, 180*c* for detecting the position of a refuse container 130 proximate the vehicle 102 can include, but are not limited to, an analog sensor, a digital sensor, a CAN bus sensor, a magnetostrictive sensor, a RADAR sensor, a LIDAR sensor, a laser sensor, an ultrasonic sensor, an infrared (IR) sensor, a stereo camera sensor, a three-dimensional (3D) camera, an in-cylinder sensor, or a combination thereof. In some examples, container detection sensors 180*a*, 180*b*, 180*c* include optical sensors. In some implementations, container detection sensors 180*a*, 180*b*, 180*c* include two or more analog ultrasonic sensors coupled to the grabber beam 248.

A computing device (such as onboard computing device 132 of FIG. 1) can receive data from the container detection sensors 180*a*, 180*b*, 180*c* indicating the presence and position of a refuse container 130. In some implementations, the gripper arms 116*a*, 116*b* are automatically positioned to a target relative positioning provided by the operator 150 using a controller (such as controller 140 and controller 142) in response to a computing device receiving data from the container detection sensors 180*a*, 180*b*, 180*c* indicating the presence of a refuse container 130. For example, computing device 132 can receive data from the container detection sensors 180*a*, 180*b*, 180*c* and determine, based on the data received, that the vehicle 102 is positioned within a distance sufficiently close to a refuse container 130 to engage the refuse container 130. In some examples, in response to a determination by the computing device 132 that the vehicle 102 is in proximity to engage a refuse container, the gripper arms 116*a*, 116*b* are automatically moved to a target relative positioning selected by the operator 150 using a controller 140 or controller 142.

In some implementations, a computing device can determine the width of the detected refuse container 130 based on the data received from the container detection sensors 180*a*, 180*b*, 180*c*.

In response to the container detection sensors 180*a*, 180*b*, 180*c* detecting the presence of a refuse container 130 and computing device 132 determining the width of the container 130 based on data received from the container detection sensors 180*a*, 180*b*, 180*c*, a signal can be sent to the computing device 132 of the vehicle 102 to automatically adjust the relative positioning of the gripper arms 116*a*, 116*b*. For example, a signal can be sent to the computing device 132 of the vehicle 102 to automatically adjust the relative positioning of the gripper arms 116*a*, 116*b* such that the distance 260 between the ends 126*a*, 126*b* of the gripper arms 116*a*, 116*b* is slightly larger than the width of the refuse container 130 determined based on the data received from the container detection sensors 180*a*, 180*b*, 180*c*. For example, upon receiving a signal conveying the width of a refuse container 130 determined based on data captured by the container detection sensors 180*a*, 180*b*, 180*c*, an onboard computing device 132 determines the current relative positioning of the gripper arms 116*a*, 116*b* based on data received from grabber position sensor 106, and determines the amount of piston 242 travel required to adjust the relative positioning of the gripper arms 116*a*, 116*b* such that the distance between the ends 126*a*, 126*b* of the gripper arms 116*a*, 116*b* is slightly larger than the detected width. The gripper arms 116*a*, 116*b* are automatically moved inward or outward, based on the relative positioning of the gripper arms 116*a*, 116*b* and the detected width of the refuse container 130, until the grabber position sensor 106 detects that the amount of piston 242 extension corresponds to a distance 260 between the gripper arms 116*a*, 116*b* that is slightly larger than the detected width of the refuse container 130. For example, if the detected width 270 of the refuse container is 47 inches, and current distance 260 between the gripper arms 116*a*, 116*b* is 45 inches, the gripper arms 116*a*, 116*b* will automatically move outward from one another until sensor 106 detects that the amount of extension of piston 242 corresponds to a distance 260 between the ends 126*a*, 126*b* of the gripper arms 116*a*, 116*b* that is slightly larger than 47 inches (e.g., until the distance 260 is equal to 51 inches).

In some implementations, in response to determining a width 270 of a refuse container 130 based data captured by container detection sensors 180*a*, 180*b*, 180*c*, the distance 260 between the gripper arms 116*a*, 116*b* is automatically adjusted to a distance that is approximately four inches larger than the detected width. In some implementations, an operator may adjust the difference in distance between the gripper arm 116*a*, 116*b* distance 260 and the detected width 270 of the container 130 (the "clearance distance"). For example, an operator may set the clearance distance as six inches, and in response to determining a width 270 of a refuse container 130 based on data captured by the container detection sensors 180_a_, 180_b_, 180_c_, the relative positioning of the gripper arms 116_a_, 116_b_ will be automatically adjusted such that the distance 260 between the gripper arms 116_a_, 116_b_ is six inches larger than the detected width 270.

The automatic positioning of the grabber 113 of the refuse collection vehicle 102 based on data captured by the container detection sensors 180_a_, 180_b_, 180_c_ and processed by a computing device 132 can be conducted automatically with minimal or no operator involvement. For example, as described above, the relative positioning the gripper arms 116_a_, 116_b_ of the grabber 113 can be automatically adjusted without operator input up in response to receiving a signal from a computing device conveying the width of the refuse container 130 as determined by data captured by the container detection sensors 180_a_, 180_b_, 180_c_. In some examples, the relative position of the grabber 113 is automatically adjusted based on receiving data conveying the position of the refuse container 130 and in response to an operator 150 of the vehicle manually engaging a switch to initiate a dump cycle (as depicted in FIGS. 2A-2C).

In some implementations, the refuse collection vehicle 102 is configured to perform a dump cycle (as depicted in FIGS. 2A-2C), in response to an operator 150 engaging a switch 160. In some examples, the gripper arms 116_a_, 116_b_ are automatically positioned to a position 420 previously selected by the operator using controllers 140, 142 in response to the operator 150 manually engaging the switch 160. For example, an operator can set a positioning 420 for the grabber 113 using controller 142, and in response to operator 150 manually engaging the switch 160 to initiate a dump cycle, the grabber 113 is automatically moved to the positioning 420 selected by the operator using controller 142. In some examples, once the gripper arms 116_a_, 116_b_ have reached the selected position 420 (as determined by sensor 106), the lift arm 111 is extended to engage the container and the dump cycle of engaging, lifting, and dumping the refuse container 130 is conducted.

Dump cycle switch 160 can include, but is not limited to, a push button. In some implementation, switch 160 is provided as a springloaded, momentary contact button. In some implementations, switch 160 is provided as a potted and sealed LED illuminated push button with finger guards. For example, manually engaging switch 160 can include pressing and holding switch 208 throughout the dump cycle.

In some implementations, the dump cycle continues to completion as long as the switch 160 remains manually engaged. For example, vehicle operator 150 presses the switch 160 to initiate the dump cycle and continues manually engaging (i.e. holding) the switch 160 throughout each step of the dump cycle to complete the dump cycle. In some instances, the dump cycle automatically stops upon disengaging the switch. For example, if vehicle operator 150 disengages switch 160 during the dump cycle, the dump cycle will automatically stop in its current position and lift arm 204(1) will cease movement.

In some implementations, after stopping the dump cycle by disengaging the switch 160, reengaging the switch 160 causes the dump cycle to continue to completion as long as the switch 160 continues to remain engaged. In some instances, reengaging the switch 160 will cause the dump cycle to continue from the point at which it previously stopped. For example, after operator 150 stops dump cycle by disengaging switch 160, operator can reengage the switch 160 to continue the dump cycle from the point at which it was stopped. In some implementations, the point at which the dump cycle was stopped can be determined by analyzing data provided by the body sensors 106.

In some instance, after completion of a dump cycle, the gripper arms 116_a_, 116_b_ of the grabber 113 are positioned in a travel position. For example, the grabber 113 of vehicle 102 is placed in a travel position following completion of the dump cycle. In some implementations, the travel position includes positioning the gripper arms 116_a_, 116_b_ of the grabber 204(2) in a fully tucked position.

Figure 6:
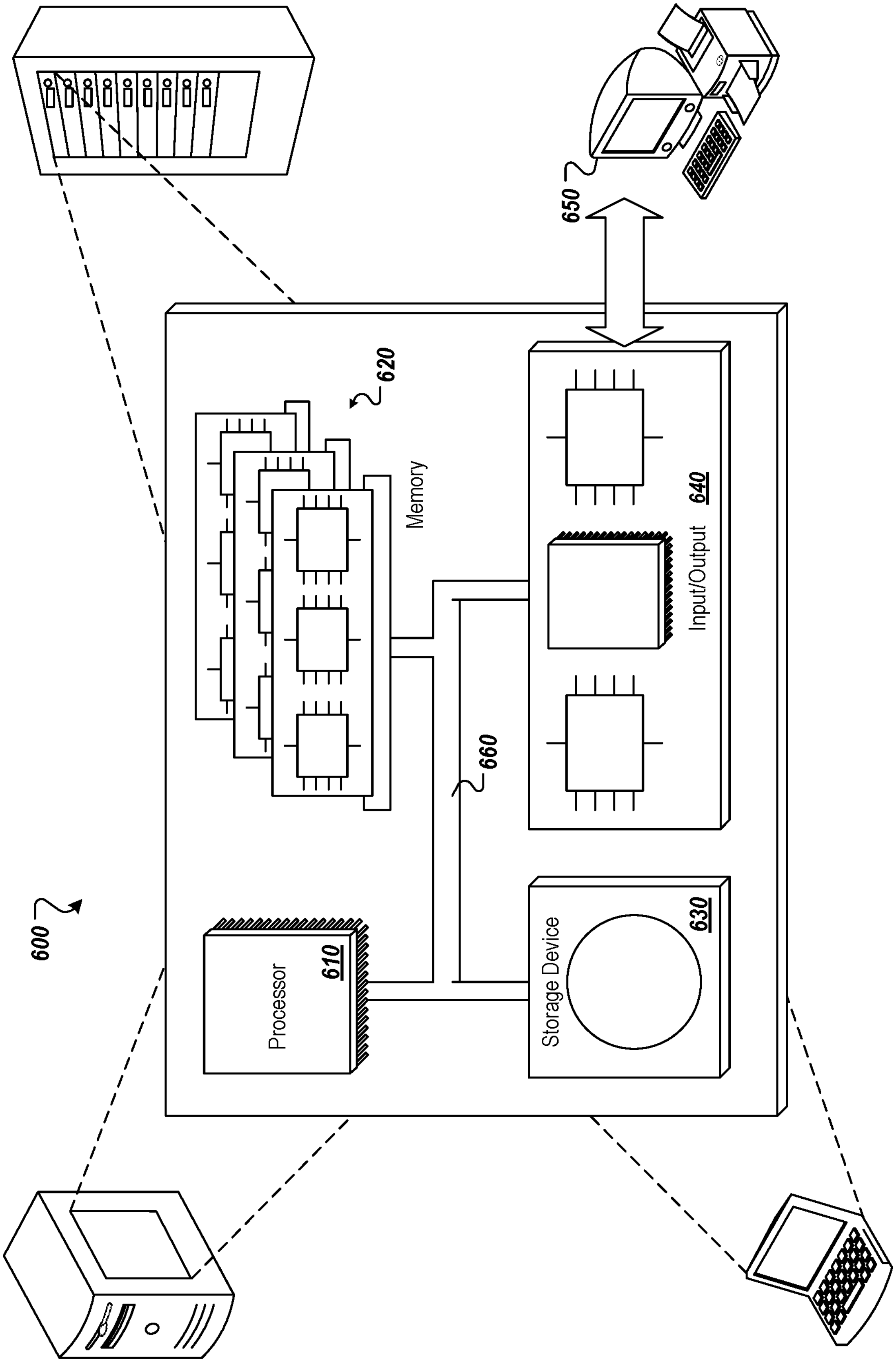
FIG. 6 depicts an example computing system.

FIG. 6 depicts an example computing system, according to implementations of the present disclosure. The system 600 may be used for any of the operations described with respect to the various implementations discussed herein. For example, the system 600 may be included, at least in part, in one or more of the onboard computing device 132, and/or other computing device(s) or system(s) described herein. The system 600 may include one or more processors 610, a memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

What is claimed is:

1. A refuse collection vehicle comprising:

a grabber that is operable to engage a refuse container, wherein the grabber comprises a first arm and a second arm;

at least one container sensor arranged to generate sensor data indicating a presence of the refuse container; and an onboard computing device coupled to the at least one container sensor, wherein the first arm and the second arm automatically move to a target positioning in response to a determination of the target positioning by the onboard computing device, wherein, to automatically move the first arm and the second arm to the target positioning, the onboard computing device is configured to:

determine, based at least in part on the sensor data from the at least one container sensor, a dimensional feature of the refuse container; and determine the target positioning based at least in part on the dimensional feature of the refuse container.

2. The refuse collection vehicle of claim 1, wherein automatically moving the first arm and the second arm to the target positioning further comprises:

receiving, by the onboard computing device, data collected by at least one body sensor, the data indicating a relative positioning of the first arm and the second arm;

receiving, by the onboard computing device, the sensor data from the at least one container sensor;

determining, by the onboard computing device, the presence of the refuse container based on the sensor data received from the at least one container sensor;

determining, based on the relative positioning between the first arm and the second arm and the target positioning, a direction of travel of a piston coupled to the grabber, wherein the direction of travel is a direction that the piston is required to travel to position the first arm and the second arm in the target positioning; and in response to determining the presence of the refuse container, moving the piston in the determined direction of travel.

3. The refuse collection vehicle of claim 1, wherein:

the onboard computing device determines the target positioning based on the sensor data from the at least one container sensor; and automatically moving the first arm and the second arm to the target positioning further comprises:

receiving, by the onboard computing device, data collected by at least one body sensor, the data indicating a relative positioning of the first arm and the second arm;

receiving, by the onboard computing device, the sensor data from the at least one container sensor;

determining, based on the relative positioning between the first arm and the second arm and the target positioning, a direction of travel of a piston coupled to the grabber, wherein the direction of travel is a direction that the piston is required to travel to position the first arm and the second arm in the target positioning; and moving the piston in the determined direction of travel.

4. The refuse collection vehicle of claim 3, wherein determining the target positioning based on the sensor data received from the at least one container sensor comprises:

analyzing, by the onboard computing device, the sensor data received from the at least one container sensor to determine that the refuse collection vehicle is proximate the refuse container;

processing, by the onboard computing device, the sensor data received from the at least one container sensor to determine a width of the refuse container; and determining, based on the width of the refuse container, the target positioning.

5. The refuse collection vehicle of claim 4, wherein the target positioning comprises a distance between the first arm and the second arm that is larger than the width of the refuse container.

6. The refuse collection vehicle of claim 1, wherein the first arm and the second arm travel an equal amount in response to the determination of the target positioning.

7. The refuse collection vehicle of claim 1, further comprising:

at least one body sensor that is arranged to collect data indicating a positioning of at least one of the first arm or the second arm, wherein the at least one body sensor is located in a cylinder coupled to the grabber, and wherein the onboard computing device is further coupled to the at least one body sensor.

8. The refuse collection vehicle of claim 7, wherein the onboard computing device determines a distance between the first arm and the second arm based on an amount of extension of a piston coupled to the cylinder, and wherein the amount of extension is detected by the at least one body sensor.

9. The refuse collection vehicle of claim 1, wherein the at least one container sensor is coupled to a grabber beam of the refuse collection vehicle.

10. A method, comprising:

receiving, by an onboard computing device of a refuse collection vehicle, sensor data generated by at least one container sensor of the refuse collection vehicle, wherein the sensor data indicates a presence of a refuse container;

determining, by the onboard computing device, a target positioning for a grabber of the refuse collection vehicle, the determining comprising:

determining, based at least in part on the sensor data from the at least one container sensor, a dimensional feature of the refuse container; and determining the target positioning based at least in part on the dimensional feature of the refuse container; and causing, by the onboard computing device, a first arm and a second arm of the grabber to automatically move to the target positioning.

11. The method of claim 10, further comprising:

receiving, by the onboard computing device, data collected by at least one body sensor, the data indicating a relative positioning of the first arm and the second arm;

determining, by the onboard computing device, the presence of the refuse container based on the sensor data received from the at least one container sensor; and determining, based on the relative positioning and the target positioning, a direction of travel of a piston coupled to the grabber, wherein the direction of travel is a direction that the piston is to travel to position the first arm and the second arm in the target positioning;

wherein the causing the first arm and the second arm to automatically move to the target positioning comprises causing the piston to move in the direction of travel in response to determining the presence of the refuse container.

12. The method of claim 10, further comprising:

receiving, by the onboard computing device, data collected by at least one body sensor, the data indicating a relative positioning of the first arm and the second arm; and determining, based on the relative positioning and the target positioning, a direction of travel of a piston coupled to the grabber, wherein the direction of travel is a direction that the piston is to travel to position the first arm and the second arm in the target positioning;

wherein the causing the first arm and the second arm to automatically move to the target positioning comprises causing the piston to move in the direction of travel.

13. The method of claim 12, wherein the determining the target positioning comprises:

analyzing, by the onboard computing device, the sensor data received from the at least one container sensor to determine that the refuse collection vehicle is proximate the refuse container;

processing, by the onboard computing device, the sensor data to determine a width of the refuse container; and determining, based on the width of the refuse container, the target positioning.

14. The method of claim 13, wherein the target positioning comprises a distance between the first arm and the second arm that is larger than the width of the refuse container.

15. The method of claim 10, wherein the causing the first arm and the second arm to automatically move to the target positioning comprises causing the first arm and the second arm to travel an equal amount in response to the determination of the target positioning.

16. The method of claim 10, further comprising:

receiving, by the onboard computing device, data collected by at least one body sensor of the refuse collection vehicle, the data indicating a relative positioning of the first arm and the second arm, wherein the at least one body sensor is located in a cylinder coupled to the grabber.

17. The method of claim 16, further comprising:

determining, by the onboard computing device, a distance between the first arm and the second arm based on an amount of extension of a piston coupled to the cylinder, wherein the amount of extension is detected by the at least one body sensor.

18. The method 10, wherein the determining, by the onboard computing device, the target positioning is further based at least in part on input received, by the onboard computing device, from a controller of the refuse collection vehicle.

19. The method of claim 10, wherein the target positioning comprises at least one of:

a distance between the first arm and the second arm; or an angle between each of the first arm and the second arm and a longitudinal axis of a grabber beam of the refuse collection vehicle in a range of 0 degrees to 90 degrees.

20. A method, comprising:

receiving, by an onboard computing device of a refuse collection vehicle, data generated by at least one sensor of the refuse collection vehicle, the data indicating a relative positioning of a first arm and a second arm of a grabber of the refuse collection vehicle, the grabber being operable to engage a refuse container;

receiving, from a controller of the refuse collection vehicle having one or more control elements for selecting a target positioning, an indication of the target positioning selected via the one or more control elements; and in response to receiving the target positioning, causing, by the onboard computing device, the first arm and the second arm to automatically move to the target positioning.

* * * * *